(12) United States Patent
Harris et al.

(10) Patent No.: US 11,102,228 B2
(45) Date of Patent: Aug. 24, 2021

(54) SYSTEM FOR DETERMINING WHETHER ACTIVITY OF CLIENT DEVICE IS MALICIOUS BASED ON ACTIVITY THRESHOLD

(71) Applicant: Oath Inc., New York, NY (US)

(72) Inventors: Robert Jason Harris, Urbana, IL (US); Ruichen Wang, Champaign, IL (US); Helen W. Xie, Cambridge, MA (US)

(73) Assignee: Verizon Media Inc., New York, NY (US)

( * ) Notice: Subject to any disclaimer, the term of this patent is extended or adjusted under 35 U.S.C. 154(b) by 259 days.

(21) Appl. No.: 16/426,235

(22) Filed: May 30, 2019

(65) Prior Publication Data

US 2020/0382532 A1  Dec. 3, 2020

(51) Int. Cl.
*H04L 29/06*  (2006.01)
*H04L 12/26*  (2006.01)
*H04L 29/08*  (2006.01)
*G06F 21/55*  (2013.01)

(52) U.S. Cl.
CPC ........ *H04L 63/1425* (2013.01); *G06F 21/552* (2013.01); *H04L 43/08* (2013.01); *H04L 43/0876* (2013.01); *H04L 43/16* (2013.01); *H04L 63/10* (2013.01); *H04L 63/1441* (2013.01); *H04L 63/20* (2013.01); *H04L 67/22* (2013.01); *H04L 67/42* (2013.01)

(58) Field of Classification Search
CPC .... G06F 21/552; G06F 21/554; G06F 3/0482; G06F 9/5055; H04L 43/08; H04L 43/0876; H04L 43/16; H04L 63/10; H04L 63/1425; H04L 63/1441; H04L 63/20; H04L 63/1416; H04L 63/145; H04L 67/22; H04L 67/42; H04L 41/0654; G06Q 10/06; G06Q 30/0201; G06Q 30/02

See application file for complete search history.

(56) References Cited

U.S. PATENT DOCUMENTS

| | | | | |
|---|---|---|---|---|
| 10,122,602 | B1 * | 11/2018 | Prateek | H04L 41/0654 |
| 10,805,326 | B1 * | 10/2020 | Wang | H04L 63/1416 |
| 2010/0058349 | A1 * | 3/2010 | Diwakar | G06F 9/5055 |
| | | | | 718/104 |
| 2010/0070542 | A1 * | 3/2010 | Feinsmith | G06Q 30/02 |
| | | | | 707/812 |

(Continued)

*Primary Examiner* — Le H Luu
(74) *Attorney, Agent, or Firm* — Cooper Legal Group, LLC

(57) ABSTRACT

One or more computing devices, systems, and/or methods for determining thresholds are provided. For example, first activity associated with a plurality of client devices may be detected. A first activity distribution associated with the plurality of client devices may be determined based upon the first activity. A plurality of peaks of the first activity distribution may be identified. A plurality of gradients associated with pairs of peaks of the plurality of peaks may be determined. A target peak of the plurality of peaks may be determined based upon the plurality of gradients. A threshold amount of activity associated with the first activity may be determined based upon the target peak. A first set of activity associated with a first client device may be detected. A fraudulence label associated with the first client device may be determined based upon the first set of activity and/or the threshold amount of activity.

20 Claims, 13 Drawing Sheets

(56) References Cited

U.S. PATENT DOCUMENTS

| | | | | |
|---|---|---|---|---|
| 2010/0226255 A1* | 9/2010 | DiStasio | ................. | H04L 43/08 |
| | | | | 370/241 |
| 2011/0173247 A1* | 7/2011 | Hubbard | ................. | G06Q 10/06 |
| | | | | 709/203 |
| 2014/0032265 A1* | 1/2014 | Paprocki | ............ | G06Q 30/0201 |
| | | | | 705/7.29 |
| 2017/0201850 A1* | 7/2017 | Raleigh | ................. | G06F 3/0482 |
| 2018/0167402 A1* | 6/2018 | Scheidler | ................. | G06F 21/554 |
| 2019/0364057 A1* | 11/2019 | Hazay | .................. | H04L 63/145 |

* cited by examiner

SYSTEM FOR DETERMINING WHETHER ACTIVITY OF CLIENT DEVICE IS MALICIOUS BASED ON ACTIVITY THRESHOLD

BACKGROUND

Services may be performed by a system based upon requests received from client devices, such as authentication requests, requests for content (e.g., advertisements, emails, messages, news content, videos, music, bank account information, etc.), requests to perform actions (e.g., setting up user accounts, sending emails, sending messages, uploading content to platforms, transferring funds, etc.), etc. Levels of activity of the client devices may be monitored, and client devices having levels of activity greater than an activity threshold may be blocked (e.g., temporarily, permanently, etc.) in order to prevent malicious users and/or internet bots from abusing the system.

SUMMARY

In accordance with the present disclosure, one or more computing devices and/or methods are provided. In an example, first activity associated with a plurality of client devices may be detected. A first activity distribution associated with the plurality of client devices may be determined based upon the first activity. A plurality of peaks of the first activity distribution may be identified. A plurality of relationships between pairs of peaks of the plurality of peaks may be determined (e.g., the plurality of relationships may correspond to a plurality of gradients associated with the pairs of peaks and/or a plurality of slopes associated with the pairs of peaks). A target peak of the plurality of peaks may be determined based upon the plurality of relationships. A threshold amount of activity associated with the first activity may be determined based upon the target peak. In some examples, a first set of activity associated with a first client device may be detected. A fraudulence label associated with the first client device may be determined based upon the first set of activity and/or the threshold amount of activity.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
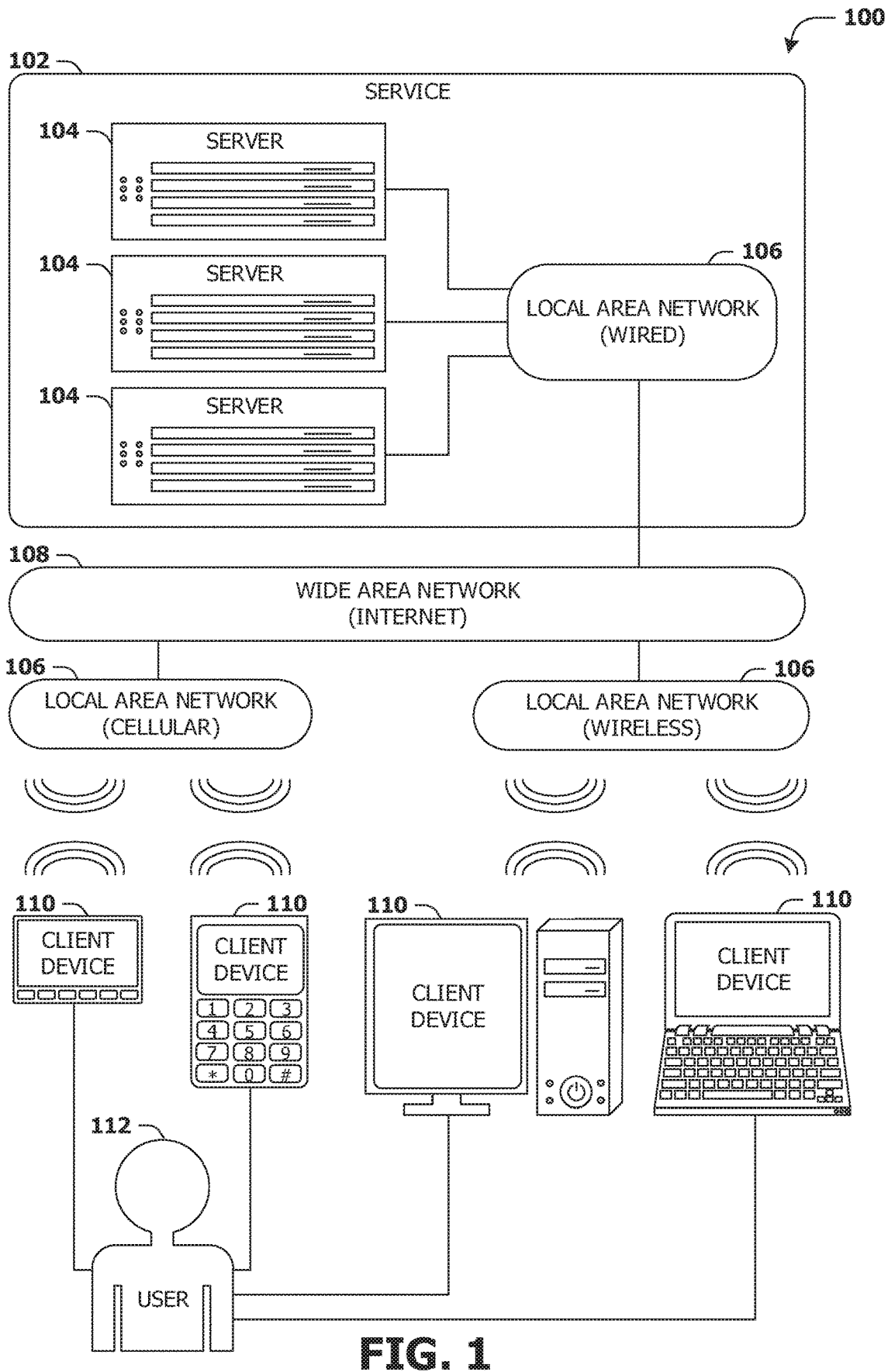
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
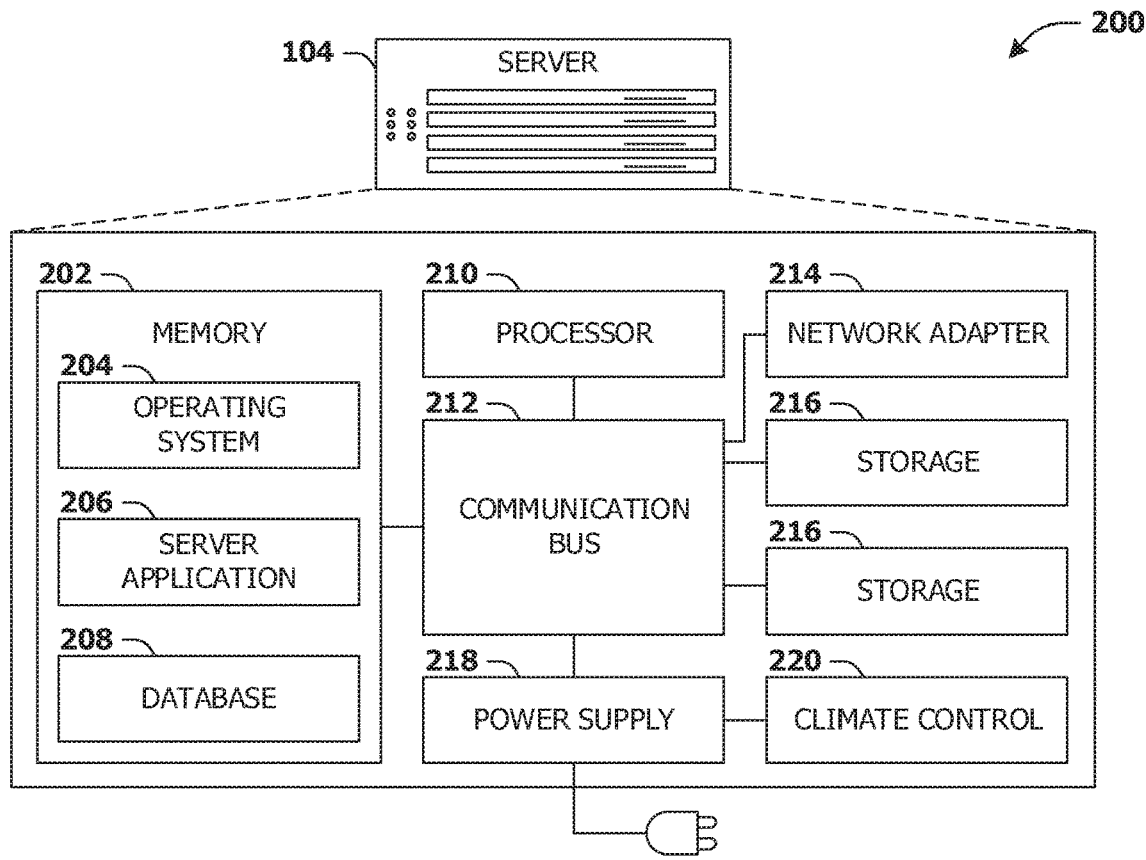
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow.

Many such servers 104 may be configured and/or adapted to utilize at least a portion of the techniques presented herein.

1.3. Client Device Configuration

Figure 3:
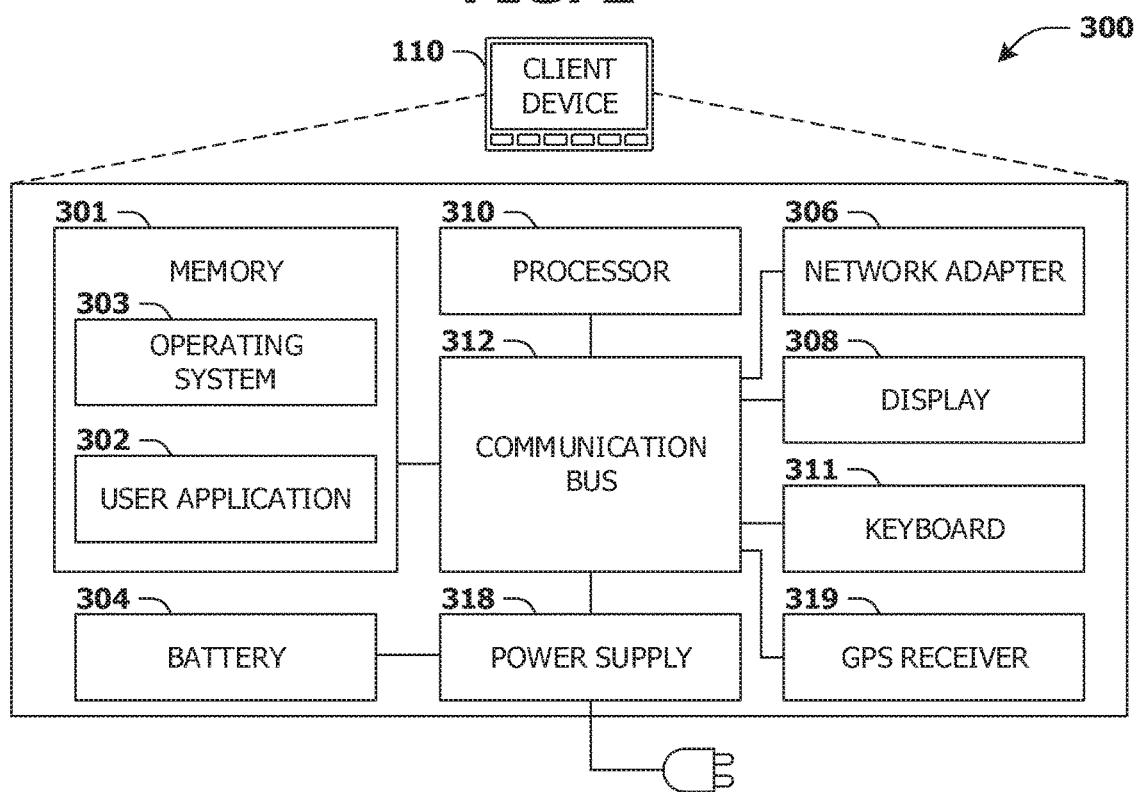
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining thresholds are provided. For example, a system may perform one or more services, such as provide client devices with access to resources, provide content to the client devices, receive and/or upload content and/or data, etc. The system may be associated with a service such as an email service, a messaging service, a social network service, a bank account service, a web browsing service, a web searching service, a web gaming service, an electronic commerce service, a content (e.g., audio, video, images, etc.) service, an advertising service, etc. Amounts of activity of client devices using the system may be determined in order to detect whether activity of a client device is fraudulent and/or malicious activity (e.g., advertisement fraud, spamming, denial of service attacks, hacking attacks, etc.) and/or for a different purpose. For example, an amount of activity (e.g., an amount of selections of content items, such as advertisements) associated with a first client device may be compared with a threshold amount of activity (e.g., a threshold amount of selections of content items) to determine whether activity associated with the first client device is fraudulent and/or malicious. However, the threshold amount of activity may be determined manually, requiring human effort and/or research and/or resulting in an inaccurate threshold amount of activity.

Thus, in accordance with one or more of the techniques provided herein, the threshold amount of activity may be determined automatically. For example, activity associated with (e.g., activity performed in association with) a plurality of client devices may be detected. A first activity distribution may be determined based upon the activity. A plurality of peaks of the first activity distribution may be identified. A plurality of relationships between pairs of peaks of the plurality of peaks may be determined (e.g., the plurality of relationships may correspond to a plurality of gradients associated with the pairs of peaks and/or a plurality of slopes associated with the pairs of peaks). A target peak of the plurality of peaks may be determined based upon the plurality of relationships. The threshold amount of activity may be determined based upon the target peak.

Figure 4:
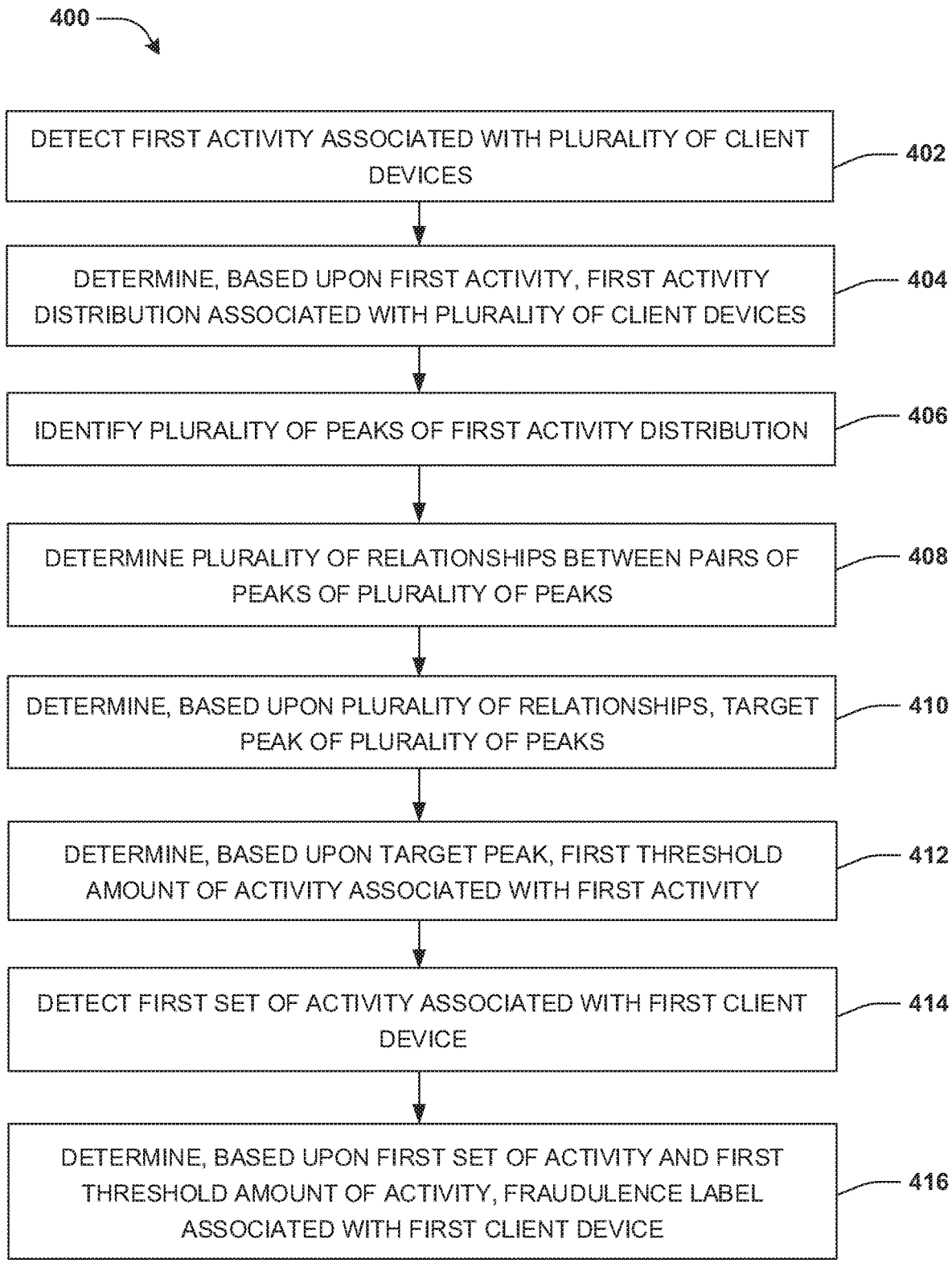
FIG. 4 is a flow chart illustrating an example method for determining thresholds.

An embodiment of determining thresholds is illustrated by an example method 400 of FIG. 4. A content system may perform one or more services, such as provide client devices with access to resources, provide content to the client devices, receive and/or upload content and/or data, etc. The content system may be associated with a service such as a content (e.g., audio, video, images, etc.) service, an email service, a messaging service, a social network service, a bank account service, a web browsing service, a web searching service, a web gaming service, an electronic commerce service, etc. Amounts of activity associated with client devices using the content system may be determined in order to determine whether activity of a client device is fraudulent and/or malicious activity (e.g., advertisement fraud, spamming, denial of service attacks, hacking attacks, etc.) and/or for a different purpose. For example, amounts of activity associated with client devices may be compared with activity thresholds to determine whether the amounts of activity are associated with fraudulent and/or malicious activity.

In some examples, the content system may be an advertisement system. Alternatively and/or additionally, the content system may not be an advertisement system. The content system may provide content items (e.g., advertisements) to be presented via pages associated with the content system. For example, the pages may be associated with websites (e.g., search engine websites, email service websites, news content websites, communication service websites, video platform websites, multimedia platform websites, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application (e.g., a mobile application) associated with the content system and/or within a game associated with the content system. Alternatively and/or additionally, a user may be required to watch and/or interact with the content item before the user can access content of a web page, utilize resources of an application and/or play a game.

At 402, first activity associated with a plurality of client devices may be detected. The plurality of client devices may be associated with a plurality of user accounts. For example, activity of the first activity may be determined to be associated with a user account of the plurality of user accounts and/or an exemplary client device of the plurality of client devices by determining that the activity is associated with the user account (e.g., the activity may be analyzed to identify an indication of the user account, such as a username associated with the user account). Alternatively and/or additionally, the activity of the first activity may be determined to be associated with the exemplary client device by determining that the user account is associated with the exemplary client device.

Alternatively and/or additionally, the plurality of client devices may be associated with a plurality of IP addresses. For example, activity of the first activity may be determined to be associated with an IP address of the plurality of IP addresses and/or an exemplary client device of the plurality of client devices by determining that the activity is associated with the IP address (e.g., the activity may be analyzed to identify an indication of the IP address). Alternatively and/or additionally, the activity of the first activity may be determined to be associated with the exemplary client device by determining that the IP address is associated with the exemplary client device.

Alternatively and/or additionally, the plurality of client devices may be associated with a plurality of client identifiers. For example, activity of the first activity may be determined to be associated with a client identifier (e.g., device identification information) of the plurality of client identifiers and/or an exemplary client device of the plurality of client devices by determining that the activity is associated with the client identifier (e.g., the activity may be analyzed to identify an indication of the client identifier). Alternatively and/or additionally, the activity of the first activity may be determined to be associated with the exemplary client device by determining that the client identifier is associated with the exemplary client device.

In some examples, the first activity be associated with reception of requests for content associated with the plurality of client devices. For example, the first activity may be detected by receiving requests for content associated with the plurality of client devices. For example, an exemplary request for content may be received responsive to an exemplary client device of the plurality of client devices accessing an internet resource associated with the content system (e.g., one or more of a web page of a website associated with the content system, an application associated with the content system, an internet game associated with the website system, etc.). For example, the exemplary client device may transmit a request to access the internet resource to a first server associated with the internet resource. Responsive to receiving the request to access the internet resource, the first server associated with the internet resource may transmit the exemplary request for content to the content system (and/or to a second server associated with the content system). Alternatively and/or additionally, the exemplary request for content may be received from the exemplary client device. In some examples, the exemplary request for content may correspond to a request to be provided with a content item (e.g., an advertisement, an image, a link, a video, etc.) for presentation via the internet resource.

Alternatively and/or additionally, the first activity may be associated with selections of content associated with the plurality of client devices (e.g., the first activity may be associated with ad clicks of the plurality of client devices). For example, the first activity may be detected by receiving selections of content from the plurality of client devices. A selection of content of the selections of content may correspond to a selection, via a client device, of a content item, such as an advertisement. For example, responsive to receiving an exemplary request for content associated with an exemplary client device of the plurality of client devices, an exemplary content item (e.g., an advertisement) may be selected for presentation via the exemplary client device. The exemplary content item may be transmitted to the exemplary client device and/or may be presented via the exemplary client device. A selection of the exemplary content item may be received from the exemplary client device. For example, the exemplary content item may be selected via clicking (and/or tapping) the exemplary content item using the exemplary client device.

Alternatively and/or additionally, the first activity may be associated with transmission of content to the plurality of client devices. For example, the first activity may be detected by identifying content items transmitted to the plurality of client devices. For example, the content items may be transmitted to the plurality of client devices responsive to receiving requests for content associated with the plurality of client devices. For example, responsive to receiving an exemplary request for content associated with an exemplary client device of the plurality of client devices, an exemplary content item (e.g., an advertisement) may be transmitted to the exemplary client device.

Alternatively and/or additionally, the first activity may be associated with presentation of content via the plurality of client devices (e.g., the first activity may be associated with ad impressions of the plurality of client devices). For example, the first activity may be detected by identifying content items presented via the plurality of client devices. For example, responsive to receiving an exemplary request for content associated with an exemplary client device of the plurality of client devices, an exemplary content item (e.g., an advertisement) may be transmitted to the exemplary client device. It may be determined that the exemplary content item is presented via the exemplary client device based upon a determination that the exemplary content item is transmitted to the exemplary client device. Alternatively and/or additionally, it may be determined that the exemplary content item is presented via the exemplary client device based upon reception of an indication that the exemplary content item is displayed and/or presented by the exemplary client device from the exemplary client device. Alternatively and/or additionally, it may be determined that the exemplary content item is presented via the exemplary client device based upon reception, from the exemplary client device and/or a server associated with an internet resource associated with the exemplary request for content, of an indication that the exemplary content item is displayed and/or presented in a location of the internet resource that is displayed by the exemplary client device (and/or is visible and/or viewable by a user). Alternatively and/or additionally, it may be determined that the exemplary content item is presented via the exemplary client device based upon reception, from the exemplary client device and/or the server associated with the internet resource, of an indication that the exemplary content item is displayed and/or presented in a location of the internet resource, where at least a threshold proportion (e.g., 50%) of the exemplary content item is displayed and/or visible to the user for a threshold duration of time (e.g., 1 second).

Alternatively and/or additionally, the first activity may be associated with conversion events associated with the plurality of client devices. For example, the first activity may be detected by detecting conversion events associated with the plurality of client devices. For example, a conversion event may be detected responsive to determining that a purchase is performed via an exemplary client device of the plurality of client devices (e.g., the conversion event may correspond to the purchase). The purchase may correspond to a purchase of a product and/or a service provided by an exemplary entity associated with a content item presented via the exemplary client device. For example, it may be determined that the purchase is performed based upon an indication of the purchase received from the exemplary client device and/or from a server associated with the exemplary entity. Alternatively and/or additionally, it may be determined that the purchase is performed by scanning emails and/or messages associated with the exemplary client device (e.g., the emails and/or the messages may be associated with an email account and/or a messaging account associated with the exemplary client device) to identify an email and/or a message indicative of a purchase receipt corresponding to the purchase.

Alternatively and/or additionally, a conversion event may be detected responsive to determining that a membership registration is performed via an exemplary client device of the plurality of client devices (e.g., the conversion event may correspond to the membership registration). The membership registration may correspond to a membership registration of a service (e.g., an email subscription, a newsletter, etc.) provided by an exemplary entity associated with a content item presented via the exemplary client device. For example, it may be determined that the membership registration is performed based upon an indication of the membership registration received from the exemplary client device and/or from a server associated with the exemplary entity. Alternatively and/or additionally, it may be determined that the membership registration is performed by scanning emails and/or messages associated with the exemplary client device to identify an email and/or a message indicative of the membership registration.

Alternatively and/or additionally, a conversion event may be detected responsive to determining that a software download is performed via an exemplary client device of the plurality of client devices (e.g., the conversion event may correspond to the software download). The software download may correspond to software being downloaded by the exemplary client device, where the software is provided by an exemplary entity associated with a content item presented via the exemplary client device. For example, it may be determined that the software download is performed based upon an indication of the software download received from the exemplary client device and/or from a server associated with the exemplary entity. Alternatively and/or additionally, it may be determined that the software download is performed by scanning emails and/or messages associated with the exemplary client device to identify an email and/or a message indicative of the software download.

In some examples, the first activity may be associated with a first type of activity. For example, the first type of activity may be associated with requests for content associated with the plurality of client devices, selections of content associated with the plurality of client devices, transmission of content to the plurality of client devices, presentation of content via the plurality of client devices and/or conversion events associated with the plurality of client devices.

In some examples, the first activity may correspond to activity, of the first type of activity, performed by and/or in association with the plurality of client devices within a period of time. For example, the period of time may correspond to one or more of 1 day, 1 hour, 30 minutes, etc.

Alternatively and/or additionally, second activity associated with a second plurality of client devices may be detected. The second plurality of client devices may be the same as the plurality of client devices. Alternatively and/or additionally, the second plurality of client devices may be different than the plurality of client devices (e.g., the second plurality of client devices may comprise one or more client devices not included in the plurality of client devices and/or the second plurality of client devices may not comprise one or more client devices included in the plurality of client devices). In some examples, the second activity may be associated with a second type of activity, different than the first type of activity. In an example, the first activity may be associated with selections of content associated with the plurality of client devices and/or the second activity may be associated with presentation of content via the second plurality of client devices.

The second activity may correspond to activity, of the second type of activity, performed by and/or in association with the second plurality of client devices within the period of time (and/or within a second period of time, different than the period of time).

At 404, a first activity distribution associated with the plurality of client devices may be determined based upon the first activity. In some examples, the first activity distribution may be indicative of amounts of activity and/or quantities of client devices associated with the amounts of activity. For example, the first activity distribution may be indicative of a first exemplary amount of activity and/or a first exemplary quantity of client devices of the plurality of client devices associated with the first exemplary amount of activity. Alternatively and/or additionally, the first activity distribution may be indicative of a second exemplary amount of activity and/or a second exemplary quantity of client devices of the plurality of client devices associated with the second exemplary amount of activity.

In an example where the first activity is associated with selections of content associated with the plurality of client devices, the first exemplary amount of activity may correspond to 3 selections of content (e.g., 3 ad clicks) within the period of time and/or the first exemplary quantity of client devices may correspond to 643 client devices of the plurality of client devices associated with the first exemplary amount of activity. Alternatively and/or additionally, the second exemplary amount of activity may correspond to 100 selections of content (e.g., 100 ad clicks) within the period of time and/or the second exemplary quantity of client devices may correspond to 4 client devices associated with the second exemplary amount of activity. Accordingly, the first activity distribution may be indicative of 643 client devices of the plurality of devices performing 3 selections of content (e.g., selections of content items, such as advertisements, presented via the 643 client devices) during the period of time and/or 4 client devices performing 100 selections of content during the period of time.

Figure 5A:
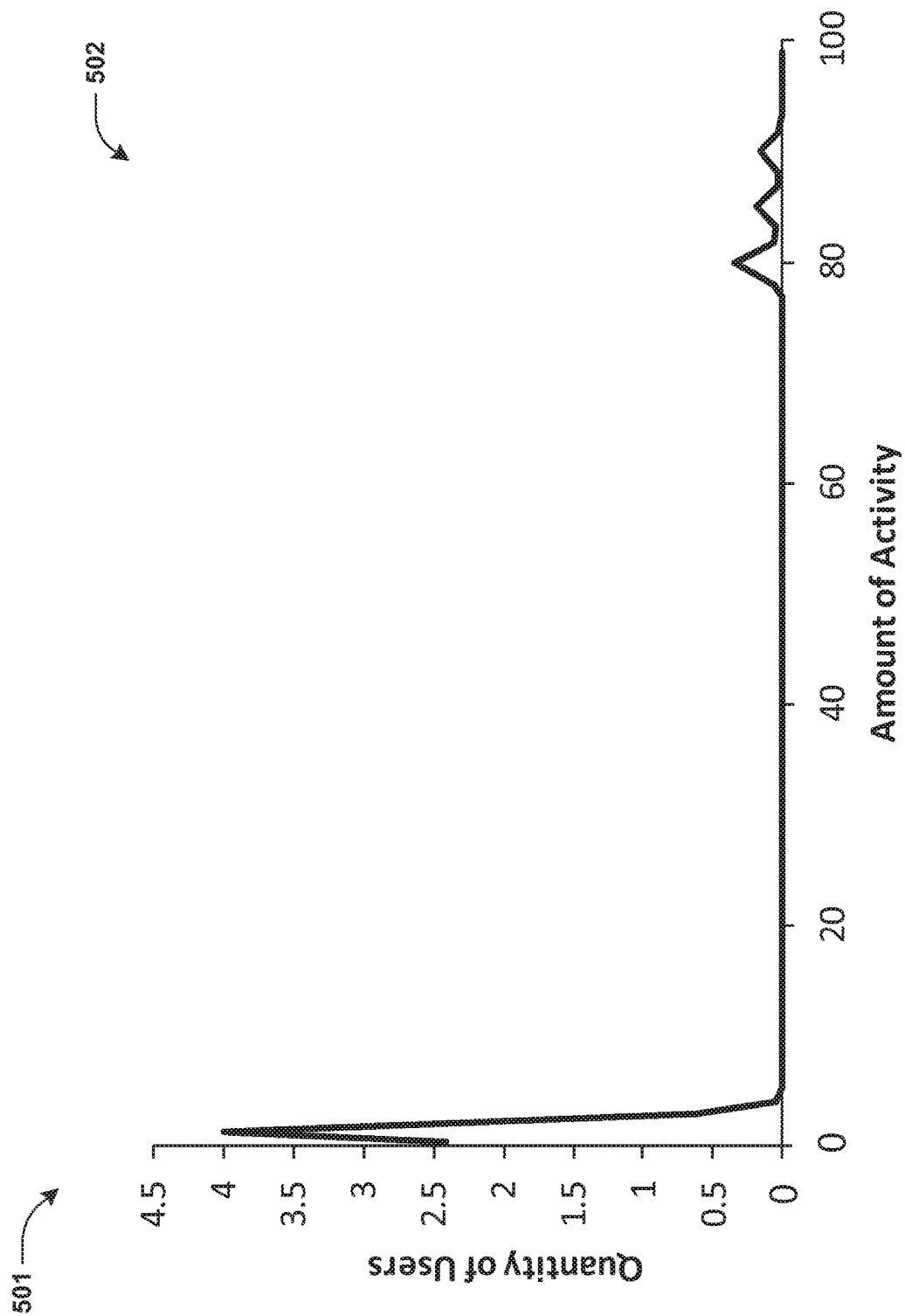
FIG. 5A is an activity distribution chart illustrating an example of a first activity distribution associated with a plurality of client devices.
Figure 5B:
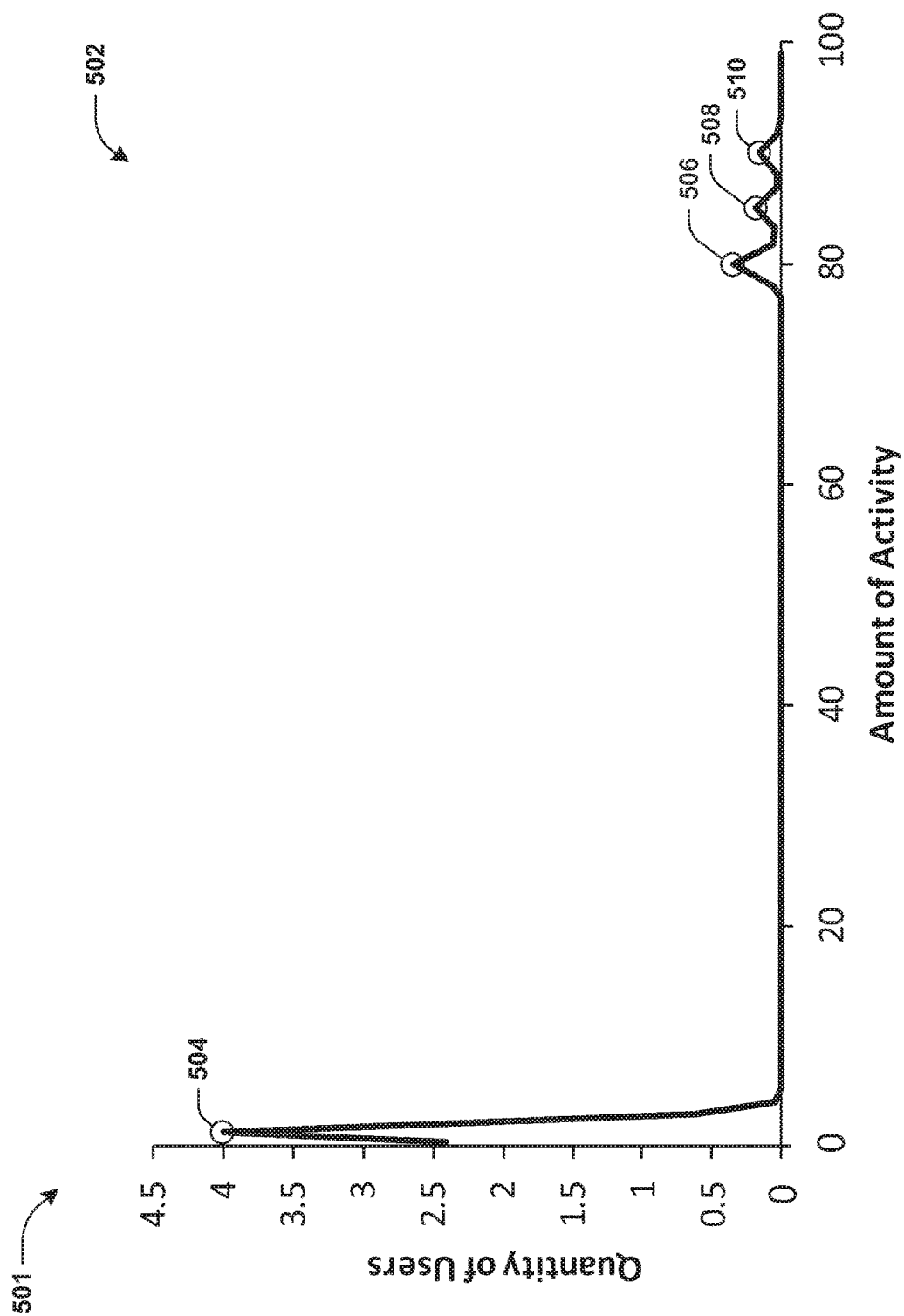
FIG. 5B is an activity distribution chart illustrating an example of a plurality of peaks of a first activity distribution.
Figure 5C:
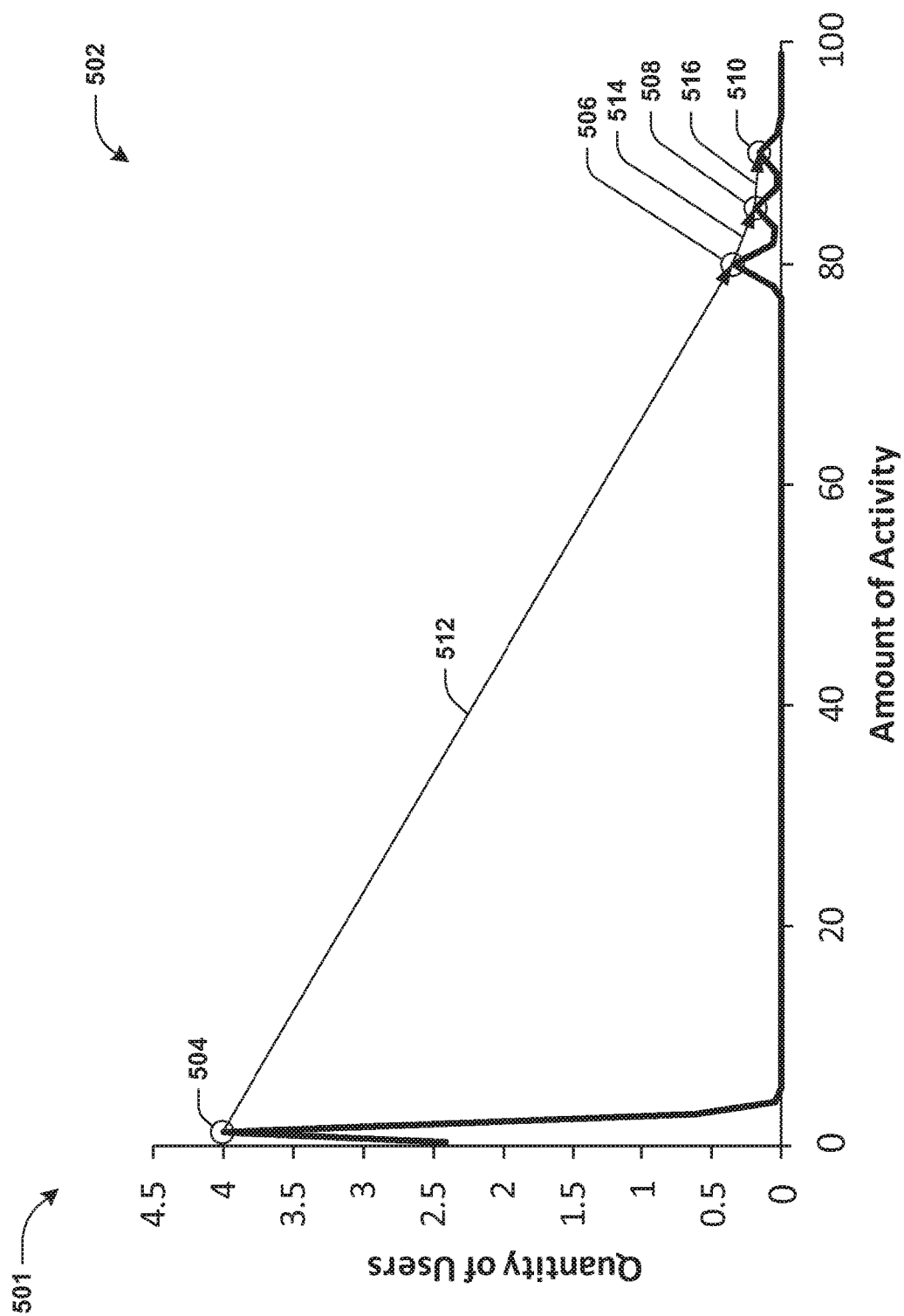
FIG. 5C is an activity distribution chart illustrating an example of a plurality of relationships between pairs of peaks of a plurality peaks of a first activity distribution.

FIGS. 5A-5C illustrate an example system 501 for determining thresholds. FIG. 5A illustrates an activity distribution chart 502 illustrating an example of the first activity distribution associated with the plurality of client devices. The vertical axis of the activity distribution chart 502 may be indicative of quantities of client devices of the plurality of client devices and/or the horizontal axis of the activity distribution chart 502 may be indicative of amounts of activity associated with the quantities of client devices. Values of the vertical axis may correspond to 10,000 s of client devices (e.g., a value of 0.5 of the vertical axis may correspond to 5,000 client devices). Alternatively and/or additionally, the vertical axis of the activity distribution chart 502 may be indicative of quantities of user accounts of the plurality of user accounts and/or the horizontal axis of the activity distribution chart 502 may be indicative of amounts of activity associated with the quantities of user accounts. Alternatively and/or additionally, the vertical axis of the activity distribution chart 502 may be indicative of quantities of IP addresses of the plurality of IP addresses and/or the horizontal axis of the activity distribution chart 502 may be indicative of amounts of activity associated with the quantities of IP addresses. Alternatively and/or additionally, the vertical axis of the activity distribution chart 502 may be indicative of quantities of client identifiers of the plurality of client identifiers and/or the horizontal axis of the activity distribution chart 502 may be indicative of amounts of activity associated with the quantities of client identifiers.

In an example, where the first activity is associated with reception of requests for content associated with the plurality of client devices, the horizontal axis of the activity distribution chart 502 may be indicative of quantities of received requests for content. In an example where the first activity is associated with selections of content associated with the plurality of client devices, the horizontal axis of the activity distribution chart 502 may be indicative of quantities of selections of content. In an example where the first activity is associated with transmission of content to the plurality of client devices, the horizontal axis of the activity distribution chart 502 may be indicative of quantities of transmitted content items. In an example where the first activity is associated with presentation of content via the plurality of client devices (e.g., ad impressions), the horizontal axis of the activity distribution chart 502 may be indicative of quantities of presented content items (e.g., quantities of ad impressions). In an example where the first activity is associated with conversion events associated with the plurality of client devices, the horizontal axis of the activity distribution chart 502 may be indicative of quantities of conversion events.

At 406, a plurality of peaks of the first activity distribution may be identified. For example, the first activity distribution may be analyzed to identify the plurality of peaks. The plurality of peaks may correspond to local maxima of the first activity distribution. For example, a peak of the plurality of peaks may correspond to a quantity of client devices associated with an amount of activity where the quantity of client devices is higher than quantities of client devices associated with amounts of activity surrounding the amount of activity associated with the quantity of client devices.

In some examples, the first activity distribution may be smoothed prior to identifying the plurality of peaks in order to limit a quantity of peaks of the plurality of peaks. Alternatively and/or additionally, prior to identifying the plurality of peaks, the first activity distribution may be analyzed to identify a second plurality of peaks of the first activity distribution. For example, the second plurality of peaks may be identified based upon a determination that each peak of the second plurality of peaks is associated with a quantity of client devices associated with an amount of activity where the quantity of client devices is higher than quantities of client devices associated with amounts of activity surrounding the amount of activity associated with the quantity of client devices.

In some examples, the plurality of peaks may meet an amplitude threshold. For example, an exemplary peak of the second plurality of peaks may be selected for inclusion in the plurality of peaks responsive to determining that the exemplary peak meets the amplitude threshold (e.g., the peak is associated with a quantity of client devices greater than a threshold quantity of client devices). Alternatively and/or additionally, an exemplary peak of the second plurality of peaks may be filtered (e.g., discarded) and/or may not be selected for inclusion in the plurality of peaks responsive to determining that the exemplary peak does not meet the amplitude threshold.

Alternatively and/or additionally, the plurality of peaks may be associated with slopes meeting a slope threshold. For example, an exemplary peak of the second plurality of peaks may be selected for inclusion in the plurality of peaks responsive to determining that a slope associated with the exemplary peak meets the slope threshold. For example, the slope of the exemplary peak may meet the slope threshold if a rate of increase associated with the exemplary peak meets a rate of increase threshold (e.g., the rate of increase may correspond to a rate at which quantities of client devices associated with amounts of activity preceding an amount of activity associated with the exemplary peak increase). Alternatively and/or additionally, the slope of the exemplary peak may meet the slope threshold if a rate of decrease associated with the exemplary peak meets a rate of decrease threshold (e.g., the rate of decrease may correspond to a rate at which quantities of client devices associated with amounts of activity following the amount of activity associated with the exemplary peak decrease). Alternatively and/or additionally, an exemplary peak of the second plurality of peaks may be filtered (e.g., discarded) and/or may not be selected for inclusion in the plurality of peaks responsive to determining that a slope associated with the exemplary peak does not meet the slope threshold.

Alternatively and/or additionally, the plurality of peaks may be associated with amounts of activity associated with client devices at and/or above an amount of activity percentile in the plurality of client devices (e.g., the 50th percentile amount of activity in the plurality of client devices, the 60th percentile amount of activity in the plurality of client devices, the 75th percentile amount of activity in the plurality of client devices, etc.). For example, the plurality of peaks may be associated with amounts of activity associated with client devices at and/or above the 50th percentile of the plurality of client devices. Accordingly, a peak of the first activity distribution associated with an amount of activity associated with an amount of activity percentile less than the 50th percentile amount of activity in the plurality of client devices may not be included in the plurality of peaks.

In some examples, the plurality of peaks (and/or the second plurality of peaks) may be identified by applying one or more peak detection techniques to the first activity distribution. For example, the one or more peak detection techniques may correspond to one or more of one or more Fourier Transformation techniques, one or more neural network peak detection techniques, etc.

FIG. 5B illustrates an example of the plurality of peaks of the first activity distribution. For example, the plurality of peaks may comprise a first peak 504, a second peak 506, a third peak 508 and/or a fourth peak 510. The first peak 504 may correspond to a first quantity of client devices (e.g., about 40,000 client devices) and/or a first amount of activity (e.g., one or more of abut 1 request for content, about 1 selection of a content item, etc.). Alternatively and/or additionally, the second peak 506 may correspond to a second quantity of client devices (e.g., about 3,500 client devices) and/or a second amount of activity (e.g., one or more of about 80 requests for content, about 80 selections of content items, etc.). Alternatively and/or additionally, the third peak 508 may correspond to a third quantity of client devices (e.g., about 2,000 client devices) and/or a third amount of activity (e.g., one or more of about 85 requests for content, about 85 selections of content items, etc.). Alternatively and/or additionally, the fourth peak 510 may correspond to a fourth quantity of client devices (e.g., about 1,600 client devices) and/or a fourth amount of activity (e.g., one or more of about 90 requests for content, about 90 selections of content items, etc.).

At 408, a plurality of relationships between pairs of peaks of the plurality of peaks may be determined. In some examples, an exemplary relationship of the plurality of relationships may be associated with an exemplary pair of peaks of the plurality of peaks. The exemplary pair of peaks may correspond to a first exemplary peak of the plurality of peaks and/or a second exemplary peak of the plurality of peaks, where a third exemplary peak of the plurality of peaks is not between the first exemplary peak and the second exemplary peak (with respect to an order of the plurality of peaks with respect to amounts of activity associated with the plurality of peaks).

In some examples, the exemplary relationship between the first exemplary peak and the second exemplary peak may be calculated (e.g., measured) based upon the first exemplary peak (e.g., a first exemplary quantity of client devices and/or a first exemplary amount of activity associated with the first exemplary peak) and the second exemplary peak (e.g., a second exemplary quantity of client devices and/or a second exemplary amount of activity associated with the second exemplary peak). In some examples, the exemplary relationship between the first exemplary peak and the second exemplary peak may correspond to a level of steepness of a line intersecting with the first exemplary peak and the second exemplary peak. Alternatively and/or additionally, the exemplary relationship between the first exemplary peak and the second exemplary peak may correspond to a gradient associated with the first exemplary peak and the second exemplary peak. For example, the exemplary relationship between the first exemplary peak and the second exemplary peak may correspond to a gradient of a line intersecting with the first exemplary peak and the second exemplary peak. Alternatively and/or additionally, the exemplary relationship between the first exemplary peak and the second exemplary peak may correspond to a slope associated with the first exemplary peak and the second exemplary peak. For example, the exemplary relationship between the first exemplary peak and the second exemplary peak may correspond to a slope of a line intersecting with the first exemplary peak and the second exemplary peak.

In some examples, the first exemplary peak may be contiguous with the second exemplary peak with respect to the order of the plurality of peaks with respect to amounts of activity associated with the plurality of peaks. For example, with respect to the example of the plurality of peaks illustrated in FIG. 5B, a first pair of peaks may correspond to the first peak 504 and the second peak 506, a second pair of peaks may correspond to the second peak 506 and the third peak 508 and/or a third pair of peaks may correspond to the third peak 508 and the fourth peak 510. For example, the first peak 504 and the third peak 508 may not correspond to a pair of peaks because the second peak 506 is between the first peak 504 and the third peak 508 with respect to the order of the plurality of peaks with respect to amounts of activity associated with the plurality of peaks.

FIG. 5C illustrates an example the plurality of relationships between the pairs of peaks of the plurality of peaks. For example, a first relationship 512 may be determined based upon the first pair of peaks (e.g., the first peak 504 and the second peak 506). The first relationship 512 may correspond to level of steepness of a line intersecting with the first peak 504 and the second peak 506. Alternatively and/or additionally, the first relationship 512 may correspond to a gradient associated with the first peak 504 and the second peak 506. For example, the first relationship 512 may correspond to a gradient of a line intersecting with the first peak 504 and the second peak 506. Alternatively and/or additionally, the first relationship 512 may correspond to a slope associated with the first peak 504 and the second peak 506. For example, the first relationship 512 may correspond to a slope of a line intersecting with the first peak 504 and the second peak 506.

A second relationship 514 may be determined based upon the second pair of peaks (e.g., the second peak 506 and the third peak 508). The second relationship 514 may correspond to level of steepness of a line intersecting with the second peak 506 and the third peak 508. Alternatively and/or additionally, the second relationship 514 may correspond to a gradient associated with the second peak 506 and the third peak 508. For example, the second relationship 514 may correspond to a gradient of a line intersecting with the second peak 506 and the third peak 508. Alternatively and/or additionally, the second relationship 514 may correspond to a slope associated with the second peak 506 and the third peak 508. For example, the second relationship 514 may correspond to a slope of a line intersecting with the second peak 506 and the third peak 508.

A third relationship 516 may be determined based upon the third pair of peaks (e.g., the third peak 508 and the fourth peak 510). The third relationship 516 may correspond to level of steepness of a line intersecting with the third peak 508 and the fourth peak 510. Alternatively and/or additionally, the third relationship 516 may correspond to a gradient associated with the third peak 508 and the fourth peak 510. For example, the third relationship 516 may correspond to a gradient of a line intersecting with the third peak 508 and the fourth peak 510. Alternatively and/or additionally, the third relationship 516 may correspond to a slope associated with the third peak 508 and the fourth peak 510. For example, the third relationship 516 may correspond to a slope of a line intersecting with the third peak 508 and the fourth peak 510.

At 410, a target peak of the plurality of peaks may be determined based upon the plurality of relationships. In some examples, the target peak may be comprised within a target pair of peaks of the pairs of peaks of the plurality of peaks. For example, the target pair of peaks may be determined based upon the plurality of relationships. For example, a plurality of levels of steepness associated with the plurality of relationships may be analyzed to identify a highest level of steepness of the plurality of levels of steepness. The target pair of peaks may be determined based upon a determination that the target pair of peaks is associated with the highest level of steepness. Alternatively and/or additionally, a plurality of gradients associated with the plurality of relationships may be analyzed to identify a greatest gradient of the plurality of gradients (e.g., the greatest gradient may have a highest value and/or a highest absolute value of the plurality of gradients). The target pair of peaks may be determined based upon a determination that the target pair of peaks is associated with the greatest gradient. Alternatively and/or additionally, a plurality of slopes associated with the plurality of relationships may be analyzed to identify a greatest slope of the plurality of slopes (e.g., the greatest slope may have a highest value and/or a highest absolute value of the plurality of slopes). The target pair of peaks may be determined based upon a determination that the target pair of peaks is associated with the greatest slope.

In some examples, the target peak may be determined based upon the target pair of peaks. For example, the target peak may be an initial peak of the target pair of peaks (with respect to the order of the plurality of peaks with respect to amounts of activity associated with the plurality of peaks). Alternatively and/or additionally, the target peak may be a last peak of the target pair of peaks (with respect to the order of the plurality of peaks with respect to amounts of activity associated with the plurality of peaks). It may be appreciated that the initial peak of the target pair of peaks may correspond to a peak of the target pair of peaks associated with an amount of activity that is less than an amount of activity associated with the last peak of the target pair of peaks.

In an example, with respect to the example of the plurality of relationships between the pairs of peaks of the plurality of peaks illustrated in FIG. 5C, the first pair of peaks (e.g., the first peak 504 and the second peak 506) may be selected as the target pair of peaks based upon the first relationship 512 associated with the first pair of peaks, the second relationship 514 associated with the second pair of peaks and/or the third relationship 516 associated with the third pair of peaks. For example, the first pair of peaks may be selected as the target pair of peaks responsive to a determination that the first relationship 512 is associated with a level of steepness of a line intersecting with the first peak 504 and the second peak 506 that is higher than levels of steepness associated with the second relationship 514 and/or the third relationship 516. Alternatively and/or additionally, the first pair of peaks may be selected as the target pair of peaks responsive to a determination that the first relationship 512 is associated with a gradient that is greater than gradients associated with the second relationship 514 and/or the third relationship 516 (e.g., an absolute value of the gradient associated with the first relationship 512 is higher than absolute values of the gradients associated with the second relationship 514 and/or the third relationship 516). Alternatively and/or additionally, the first pair of peaks may be selected as the target pair of peaks responsive to a determination that the first relationship 512 is associated with a slope that is greater than slopes associated with the second relationship 514 and/or the third relationship 516 (e.g., an absolute value of the slope associated with the first relationship 512 is higher than absolute values of the slopes associated with the second relationship 514 and/or the third relationship 516).

The target peak may be determined based upon the first pair of peaks comprising the first peak 504 and the second peak 506 (e.g., the target pair of peaks). For example, the first peak 504 may be selected as the target peak based upon a determination that the first peak 504 is an initial peak of the first pair of peaks (e.g., the first peak 504 precedes the second peak 506 with respect to the order of the plurality of peaks with respect to amounts of activity associated with the plurality of peaks). Alternatively and/or additionally, the second peak 506 may be selected as the target peak based upon a determination that the second peak 506 is a last peak of the first pair of peaks (e.g., the second peak 506 follows the first peak 504 with respect to the order of the plurality of peaks with respect to amounts of activity associated with the plurality of peaks).

At 412, a first threshold amount of activity associated with the first activity (and/or associated with the first type of activity) may be determined based upon the target peak. In an example where the first activity is associated with reception of requests for content associated with the plurality of client devices, the first threshold amount of activity may correspond to a threshold quantity of received requests for content. In an example where the first activity is associated with selections of content associated with the plurality of client devices, the first threshold amount of activity may correspond to a threshold quantity of selections of content. In an example where the first activity is associated with transmission of content to the plurality of client devices, the first threshold amount of activity may correspond to a threshold quantity of transmitted content items. In an example where the first activity is associated with presentation of content via the plurality of client devices (e.g., ad impressions), the first threshold amount of activity may correspond to a threshold quantity of presented content items (e.g., a threshold quantity of ad impressions). In an example where the first activity is associated with conversion events associated with the plurality of client devices, the first threshold amount of activity may correspond to a threshold quantity of conversion events.

In some examples, the first threshold amount of activity may correspond to (and/or may be equal to) an amount of activity associated with the target peak. In an example, with respect to the example of the plurality of peaks illustrated in FIGS. 5B-5C, the second peak 506 may be selected as the target peak. The first threshold amount of activity may be determined based upon the second amount of activity (e.g., one or more of about 80 requests for content, about 80 selections of content items, etc.) associated with the second peak 506. For example, the first threshold amount of activity may be equal to the second amount of activity associated with the second peak 506.

Alternatively and/or additionally, the first threshold amount of activity may be equal to a combination of the amount of activity associated with the target peak with a value. For example, the value may be added to the amount of activity associated with the target peak to determine the first threshold amount of activity. Alternatively and/or additionally, the value may be subtracted from the amount of activity associated with the target peak to determine the first threshold amount of activity. Alternatively and/or additionally, the value may be multiplied by the amount of activity associated with the target peak to determine the first threshold amount of activity. Alternatively and/or additionally, one or more operations (e.g., mathematical operations) may be performed using the value and/or the amount of activity associated with the target peak to determine the first threshold amount of activity.

Alternatively and/or additionally, a threshold peak may be determined based upon the target peak. For example, the first threshold amount of activity may be determined based upon the threshold peak. For example, the first threshold amount of activity may correspond to (and/or may be equal to) an amount of activity associated with the threshold peak. Alternatively and/or additionally, the first threshold amount of activity may be equal to a combination of the amount of activity associated with the threshold value with a value. For example, the value may be added to the amount of activity associated with the threshold peak to determine the first threshold amount of activity. Alternatively and/or additionally, the value may be subtracted from the amount of activity associated with the threshold peak to determine the first threshold amount of activity. Alternatively and/or additionally, the value may be multiplied by the amount of activity associated with the threshold peak to determine the first threshold amount of activity. Alternatively and/or additionally, one or more operations (e.g., mathematical operations) may be performed using the value and/or the amount of activity associated with the threshold peak to determine the first threshold amount of activity.

In some examples, the threshold peak may correspond to a peak preceding the target peak, with respect to the order of the plurality of peaks with respect to amounts of activity associated with the plurality of peaks. In some examples, the threshold peak may be contiguous with the target peak (e.g., a different peak of the plurality of peaks may not be between the target peak and the threshold peak, with respect to the order of the plurality of peaks with respect to amounts of activity associated with the plurality of peaks). In an example where the threshold peak is contiguous with the target peak and/or preceding the target peak, with respect to the example of the plurality of peaks illustrated in FIGS. 5B-5C, the second peak 506 may be selected as the target peak and/or the first peak 504 may be selected as the threshold peak. Accordingly, the first threshold amount of activity may correspond to (and/or may be equal to) the first amount of activity associated with the first peak 504 (e.g., one or more of abut 1 request for content, abut 1 selection of a content item, etc.). Alternatively and/or additionally, the threshold peak may not be contiguous with the target peak. For example, a defined number of peaks (e.g., 1 peak, 2 peaks, 3 peaks, etc.) of the plurality of peaks may be between the target peak and the threshold peak, with respect to the order of the plurality of peaks with respect to amounts of activity associated with the plurality of peaks.

Alternatively and/or additionally, the threshold peak may correspond to a peak following the target peak, with respect to the order of the plurality of peaks with respect to amounts of activity associated with the plurality of peaks. In some examples, the threshold peak may be contiguous with the target peak (e.g., a different peak of the plurality of peaks may not be between the target peak and the threshold peak, with respect to the order of the plurality of peaks with respect to amounts of activity associated with the plurality of peaks). In an example where the threshold peak is contiguous with the target peak and/or following the target peak, with respect to the example of the plurality of peaks illustrated in FIGS. 5B-5C, the second peak 506 may be selected as the target peak and/or the third peak 508 may be selected as the threshold peak. Accordingly, the first threshold amount of activity may correspond to (and/or may be equal to) the third amount of activity associated with the third peak 508 (e.g., one or more of about 85 requests for content, about 85 selections of content items, etc.).

Alternatively and/or additionally, the threshold peak may not be contiguous with the target peak. For example, a defined number of peaks (e.g., 1 peak, 2 peaks, 3 peaks, etc.) of the plurality of peaks may be between the target peak and the threshold peak, with respect to the order of the plurality of peaks with respect to amounts of activity associated with the plurality of peaks. In an example where the threshold peak follows the target peak and/or the defined number of peaks between the target peak and the threshold peak is 1 peak, with respect to the example of the plurality of peaks illustrated in FIGS. 5B-5C, the second peak 506 may be selected as the target peak and/or the fourth peak 510 may be selected as the threshold peak. Accordingly, the first threshold amount of activity may correspond to (and/or may be equal to) the fourth amount of activity associated with the fourth peak 510 (e.g., one or more of about 90 requests for content, about 90 selections of content items, etc.).

In some examples, a set of client devices, of the plurality of client devices, associated with amounts of activity exceeding the first threshold amount of activity, may be identified based upon the first threshold amount of activity. Alternatively and/or additionally, a set of fraudulence labels associated with the set of client devices may be determined based upon the amounts of activity exceeding the first threshold amount of activity. For example, the set of fraudulence labels may be indicative of activity associated with the set of client devices being fraudulent and/or malicious activity (e.g., advertisement fraud, spamming, denial of service attacks, hacking attacks, etc.). Alternatively and/or additionally, a fraudulence label of the set of fraudulence labels may be indicative of a probability that activity associated with a client device of the set of client devices is fraudulent and/or malicious activity.

At 414, a first set of activity associated with a first client device may be detected. For example, the first set of activity may comprise reception of requests for content from the first client device, selections of content items performed via the first client device, transmission of content items to the first client device, presentation of content items (e.g., ad impressions) via the first client device and/or one or more conversion events associated with the first client device.

At 416, a first fraudulence label associated with the first client device may be determined based upon the first set of activity and/or the first threshold amount of activity. For example, the first set of activity may be analyzed to determine a first amount of client activity, associated with the first type of activity, of the first set of activity. In an example where the first activity and/or the first type of activity is associated with reception of requests for content, the first amount of client activity may correspond to a quantity of requests for content received from the first client device within a duration of time (e.g., the duration of time may correspond to a duration of the period of time associated with the first activity). In an example where the first activity and/or the first type of activity is associated with selections of content items, the first amount of client activity may correspond to a quantity of selections of content items performed via the first client device within the duration of time. In an example where the first activity and/or the first type of activity is associated with transmission of content items, the first amount of client activity may correspond to a quantity of content items transmitted to the first client device within the duration of time. In an example where the first activity and/or the first type of activity is associated with presentation of content items (e.g., ad impressions), the first amount of client activity may correspond to a quantity of content items presented via the first client device within the duration of time. In an example where the first activity and/or the first type of activity is associated with conversion events, the first amount of client activity may correspond to a quantity of conversion events performed by the first client device within the duration of time.

In some examples, the first amount of client activity associated with the first set of activity may be compared with the first threshold amount of activity to determine the first fraudulence label. For example, responsive to a determination that the first amount of client activity exceeds the first threshold amount of activity (e.g., that the quantity of selections of content items performed via the first client device exceeds the threshold quantity of selections of content), the first fraudulence label may be indicative of activity associated with the first client device being fraudulent and/or malicious. Alternatively and/or additionally, responsive to a determination that the first amount of client activity does not exceed the first threshold amount of activity (e.g., that the quantity of selections of content items performed via the first client device does not exceed the threshold quantity of selections of content), the first fraudulence label may be indicative of activity associated with the first client device being valid (e.g., not fraudulent and/or not malicious).

Alternatively and/or additionally, the first fraudulence label may be indicative of a first fraud probability that activity associated with the first client device is fraudulent and/or malicious. For example, if the first amount of client activity exceeds the first threshold amount of activity, the first fraud probability may be higher than if the first amount of client activity does not exceed the first threshold amount of activity.

Alternatively and/or additionally, the first fraudulence label may be determined based upon the first set of activity associated with the first client device and/or a plurality of threshold amounts of activity associated with a plurality of types of activity. For example, a second threshold amount of activity associated with the second type of activity, different than the first type of activity, may be determined using one or more of the techniques presented herein. For example, a second activity distribution associated with the second plurality of client devices may be determined based upon the second activity. A second plurality of peaks of the second activity distribution may be identified. A second plurality of relationships between pairs of peaks of the second plurality of peaks may be determined. A second target peak of the second plurality of peaks may be determined based upon the second plurality of relationships. The second threshold amount of activity associated with the second type of activity may be determined based upon the second target peak.

In some examples, the plurality of threshold amounts of activity may comprise the first threshold amount of activity associated with the first type of activity, the second threshold amount of activity associated with the second type of activity and/or one or more threshold amounts of activity associated with one or more types of activity different than the first type of activity and/or the second type of activity. For example, the one or more threshold amounts of activity may be determined using one or more of the techniques presented herein for automatically determining thresholds.

In an example, the plurality of threshold amounts of activity may comprise the first threshold amount of activity corresponding to the threshold quantity of received requests for content, the second threshold amount of activity corresponding to the threshold quantity of selections of content, a third threshold amount of activity corresponding to the threshold quantity of transmitted content items, a fourth threshold amount of activity corresponding to the threshold quantity of presented content items and/or a fifth threshold amount of activity corresponding to the threshold quantity of conversion events.

A plurality of amounts of client activity associated with the plurality of types of activity may be determined based upon the first set of activity associated with the first client device. For example, the plurality of amounts of client activity associated with the plurality of types of activity may comprise the first amount of client activity corresponding to the quantity of requests for content received from the first client device within the duration of time, a second amount of client activity corresponding to the quantity of selections of content items performed via the first client device within the duration of time, a third amount of client activity corresponding to the quantity of content items transmitted to the first client device within the duration of time, a fourth amount of client activity corresponding to the quantity of content items presented via the first client device within the duration of time (e.g., a quantity of ad impressions) and/or a fifth amount of client activity corresponding to the quantity of conversion events performed by the first client device within the duration of time.

In some examples, the plurality of amounts of client activity may be compared with the plurality of threshold amounts of activity to determine the first fraudulence label. For example, responsive to a determination that one or more amounts of client activity of the plurality of amounts of client activity exceeds one or more threshold amounts of activity associated with the one or more amounts of client activity, the first fraudulence label may be indicative of activity associated with the first client device being fraudulent and/or malicious. Alternatively and/or additionally, responsive to a determination that a quantity of amounts of client activity of the one or more amounts of client activity exceeds a threshold quantity of amounts of client activity (and/or that a quantity of thresholds of the plurality of thresholds amounts of activity that are exceeded by the one or more amounts of client activity exceeds a threshold quantity of exceeded thresholds), the first fraudulence label may be indicative of activity associated with the first client device being fraudulent and/or malicious. Alternatively and/or additionally, responsive to a determination that the quantity of amounts of client activity of the one or more amounts of client activity does not exceed the threshold quantity of amounts of client activity (and/or that the quantity of thresholds of the plurality of thresholds amounts of activity that are exceeded by the one or more amounts of client activity does not exceed the threshold quantity of exceeded thresholds), the first fraudulence label may be indicative of activity associated with the first client device being valid.

In an example, the plurality of amounts of client activity may be compared with the plurality of threshold amounts of activity to determine that the first amount of client activity corresponding to the quantity of requests for content received from the first client device exceeds the first threshold amount of activity corresponding to the threshold quantity of received requests for content. Alternatively and/or additionally, it may be determined that the second amount of client activity corresponding to the quantity of selections of content items performed via the first client device does not exceed the second threshold amount of activity corresponding to the threshold quantity of selections of content. Alternatively and/or additionally, it may be determined that the third amount of client activity corresponding to the quantity of content items transmitted to the first client device exceeds the third threshold amount of activity corresponding to the threshold quantity of transmitted content items. Alternatively and/or additionally, it may be determined that the fourth amount of client activity corresponding to the quantity of content items presented via the first client device exceeds the fourth threshold amount of activity corresponding to the threshold quantity of presented content items. Alternatively and/or additionally, it may be determined that the fifth amount of client activity corresponding to the quantity of conversion events performed by the first client device does not exceed the fifth threshold amount of activity corresponding to the threshold quantity of conversion events.

Accordingly, in the example, it may be determined that 3 amounts of client activity of the plurality of amounts of client activity associated with the first set of activity exceed 3 threshold amounts of activity of the plurality of threshold amounts of activity (e.g., the first amount of client activity exceeds the first threshold amount of activity, the third amount of client activity exceeds the third threshold amount of activity and/or the fourth amount of client activity exceeds the fourth threshold amount of activity). Thus, the quantity of amounts of client activity of the one or more amounts of client activity (exceeding the one or more threshold amounts of activity comprising the first threshold amount of activity, the third threshold amount of activity and/or the fourth threshold amount of activity) may be equal to 3. In an example where the threshold quantity of amounts of client activity is 2, the first fraudulence label may be indicative of activity associated with the first client device being fraudulent and/or malicious (as a result of the quantity of amounts of client activity exceeding the threshold quantity of amounts of client activity). Alternatively and/or additionally, in an example where the threshold quantity of amounts of client activity is 4, the first fraudulence label may be indicative of activity associated with the first client device being valid (as a result of the quantity of amounts of client activity being less than the threshold quantity of amounts of client activity).

Alternatively and/or additionally, the first fraudulence label may be indicative of the first fraud probability that activity associated with the first client device is fraudulent and/or malicious. The first fraud probability may be determined based upon the quantity of amounts of client activity of the one or more amounts of client activity that exceed the one or more threshold amounts of activity. For example, a higher quantity of the quantity of amounts of client activity may correspond to a higher probability that activity associated with the first client device is fraudulent and/or malicious.

Similarly, in some examples, the set of fraudulence labels associated with the set of client devices of the plurality of client devices may be determined based upon the plurality of threshold amounts of activity. For example, a second plurality of amounts of client activity, of a client device of the set of client devices, associated with the plurality types of activity may be determined. The second plurality of amounts of client activity may be compared with the plurality of threshold amounts of activity using one or more of the techniques presented herein to determine a fraudulence label of the set of fraudulence labels associated with the set of client devices.

In an example where the first fraudulence label is indicative of activity associated with the first client device being fraudulent and/or where the first fraudulence label is indicative of the first fraud probability that activity associated with the first client device is fraudulent and/or malicious being higher than a threshold fraudulence probability, the first client device may be blacklisted. For example, a client device identifier, an IP address and/or a user account indication (e.g., a username) associated with the first client device may be included in a list of blacklisted client device identifiers. In some examples, responsive to receiving an exemplary request for content associated with the first client device (after blacklisting the first client device), the list of blacklisted client device identifiers may be analyzed based upon the exemplary request for content. A content item associated with the exemplary request for content may not be transmitted to the first client device based upon a determination that the first client device is blacklisted. In some examples, the first client device may be blacklisted for merely a temporary duration of time. For example, upon completion of the temporary duration of time, the client device identifier, the IP address and/or the user account indication associated with the first client device may be removed from the list of blacklisted client device identifiers.

In some examples, a determination that activity associated with the first client device is fraudulent may be indicative of the first client device being controlled via one or more of automated operation functionalities, malware, hacking techniques, etc. associated with a malicious entity, to perform malicious actions using the first client device (e.g., one or more of transmit requests for content to the content system, perform actions associated with conversion events, select content items presented via the first client device, etc.). Alternatively and/or additionally, the first fraud probability that activity associated with the first client device is fraudulent and/or malicious may be indicative of a probability that the first client device is controlled via one or more of automated operation functionalities, malware, hacking techniques, etc. associated with a malicious entity, to perform the malicious actions.

It may be appreciated that one or more of the techniques presented herein may be used for determining thresholds for use in various applications. For example, a threshold associated with banking activity may be (automatically) determined using one or more of the techniques herein. One or more banking activity distributions may be determined based upon historical banking activity associated with one or more types of banking activity. For example, the one or more banking activity distributions may be determined based upon transactions associated with a plurality of banking accounts, such as deposits into banking accounts of the plurality of banking accounts and/or withdrawals from banking accounts of the plurality of banking accounts. Alternatively and/or additionally, the historical banking activity may be associated with a specific region (e.g., the historical banking activity may be indicative of funds, originating from the specific region, deposited into a banking account of the plurality of banking accounts and/or funds transferred from a banking account of the plurality of banking account to an account associated with the specific region). One or more threshold amounts of banking activity associated with the one or more types of banking activity may be determined using the one or more banking activity distributions. For example, the one or more threshold amounts of banking activity may correspond to one or more of a threshold quantity of withdrawals associated with the specific region, a threshold quantity of deposits associated with the specific region, a threshold monetary amount of withdrawals associated with the specific region, a threshold monetary amount of deposits associated with the specific region, etc.

For example, responsive to determining that one or more amounts of banking activity associated with a banking account exceed the one or more threshold amounts of banking activity, the banking account may be frozen. Alternatively and/or additionally, responsive to determining that one or more amounts of banking activity associated with the banking account exceed the one or more threshold amounts of banking activity, a notification may be transmitted to a client device associated with the banking account. For example, the notification may be indicative of the one or more threshold amounts of banking activity being exceeded and/or a potential problem associated with the banking account with the banking account. Alternatively and/or additionally, responsive to determining that one or more amounts of banking activity associated with the banking account exceed the one or more threshold amounts of banking activity, one or more authentication processes may be required for further use of the banking account by a user (e.g., one or more of the user may be required to answer one or more security questions, the user may be required to visit a branch associated with the banking account in person to verify the user's identity, etc.).

Alternatively and/or additionally, a threshold associated with product return activity may be (automatically) determined using one or more of the techniques herein. For example, a product return distribution may be determined based upon historical product return activity. The historical product return activity may correspond to product returns of purchased products by users and/or user accounts associated with a store (e.g., a clothing store, a department store, an online store, etc.). For example, a threshold amount of product returns may be determined based upon the product return distribution. For example, the threshold amount of product returns may correspond to a threshold quantity of returned products within a duration of time. For example, responsive to determining that a quantity of returned products within the duration of time associated with a user account and/or a user exceeds the threshold quantity of returned products, the user account may be disabled and/or the user may be blacklisted (such that the user may not purchase products from the store and/or such that the user may not return products to the store).

Alternatively and/or additionally, a threshold associated with ride-sharing trip cancellation activity may be (automatically) determined using one or more of the techniques herein. For example, a ride-sharing trip cancelling distribution may be determined based upon historical ride-sharing trip cancelling activity. The historical ride-sharing trip cancelling activity may correspond to cancellations of reserved ride-sharing trips by user accounts and/or users associated with a ride-sharing service (e.g., a ride-sharing app). A cancellation of a reserved ride-sharing trip may correspond to a ride-sharing trip being reserved and/or cancelled via the ride-sharing service. For example, a threshold amount of ride-sharing trip cancelling activity may be determined based upon the ride-sharing trip cancelling distribution. For example, the threshold amount of ride-sharing trip cancelling activity may correspond to a threshold quantity of cancellations of reserved ride-sharing trips within a duration of time. For example, responsive to determining that a quantity of cancellations of reserved ride-sharing trips within the duration of time associated with a user account of the ride-sharing service exceeds the threshold quantity of cancellations of reserved ride-sharing trips, the user account may be disabled and/or the user account may be blacklisted (such that ride-sharing trips may not be reserved and/or canceled via the user account and/or by the user).

FIGS. 6A-6F illustrate examples of a system 601 for determining whether activity associated with a client device is fraudulent and/or malicious based upon the activity and one or more automatically determined thresholds. A first user, such as user Jennifer, (and/or a client device 600 associated with the first user) may access and/or interact with a service, such as a browser, software, a website, an application, an operating system, an email interface, a messaging interface, a music-streaming application, a video application, etc. that provides a platform for viewing and/or downloading content from a server associated with the content system.

Figure 6A:
FIG. 6A is a component block diagram illustrating an example system for determining whether activity associated with a client device is fraudulent and/or malicious based upon the activity and one or more automatically determined thresholds, where a client device presents and/or accesses a first web page using a browser of the client device.

FIG. 6A illustrates the client device 600 presenting and/or accessing a first web page 608 using a browser of the client device 600. The browser may comprise an address bar 602 comprising a web address (e.g., a URL) of the first web page 608. The first web page 608 may comprise a search interface. For example, the search interface may comprise a web search engine designed to search for information throughout the internet. In some examples, the first web page 608 may comprise a search field 606. For example, a query "stock market" may be entered into the search field 606. In some examples, the first web page 608 may comprise a search selectable input 604 corresponding to performing a search based upon the query. For example, the search selectable input 604 may be selected.

Figure 6B:
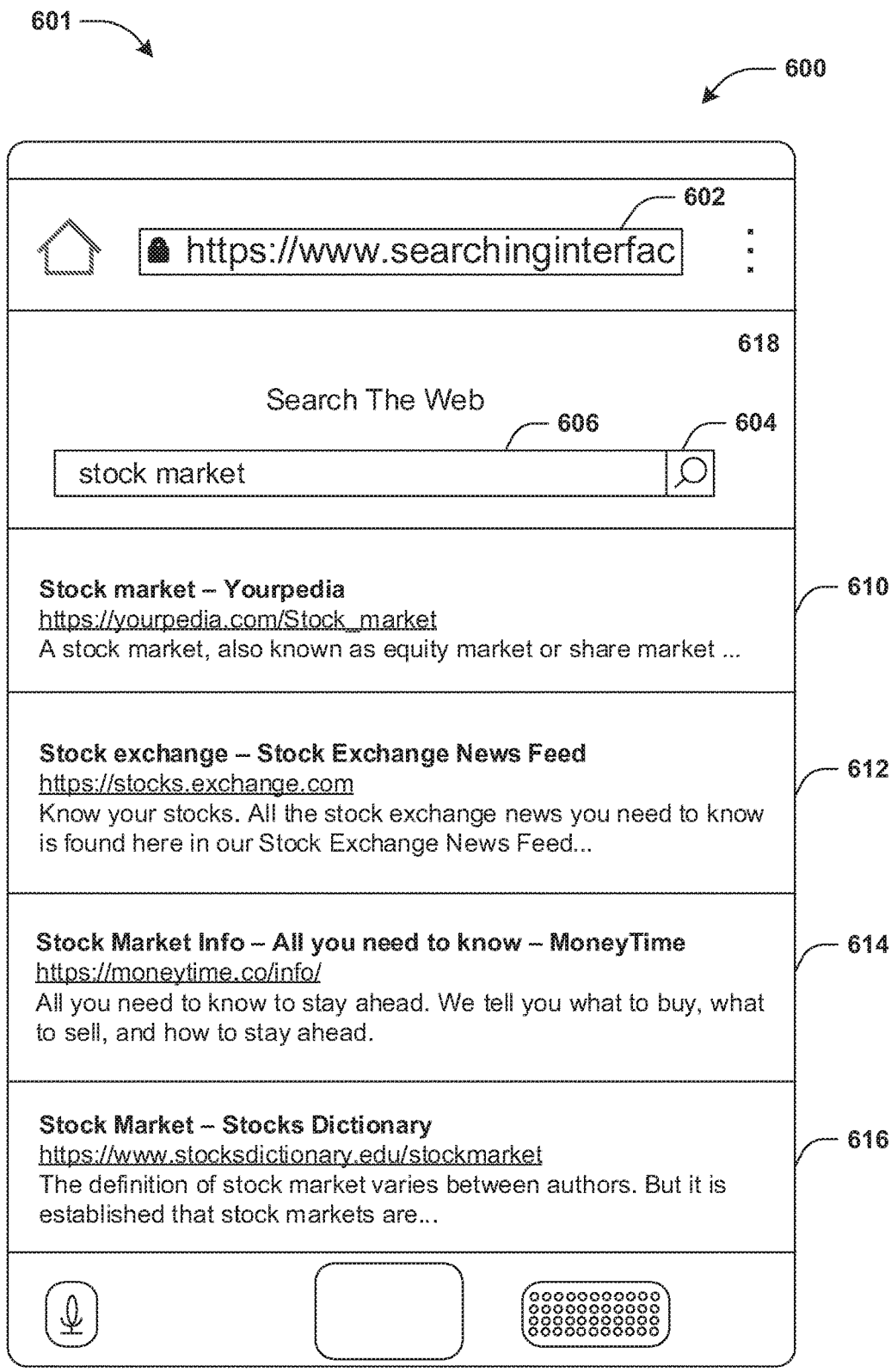
FIG. 6B is a component block diagram illustrating an example system for determining whether activity associated with a client device is fraudulent and/or malicious based upon the activity and one or more automatically determined thresholds, where a client device presents a plurality of search results associated with a query using a browser of the client device.

FIG. 6B illustrates the client device 600 presenting a plurality of search results associated with the query using the browser of the client device 600. For example, the plurality of search results may be presented within a second web page 618. For example, the plurality of search results may comprise a first search result 610 corresponding to a third web page, a second search result 612 corresponding to a fourth web page 644 (illustrated in FIG. 6F), a third search result 614 corresponding to a fifth web page and/or a fourth search result 616 corresponding to a sixth web page.

In some examples, each search result of the plurality of search results may comprise a selectable input (e.g., a link) corresponding to accessing a web page associated with the search result. In some examples, the second search result 612 corresponding to the fourth web page 644 may be selected (e.g., the second search result 612 may be selected via a second selectable input corresponding to the second search result 612).

Figure 6C:
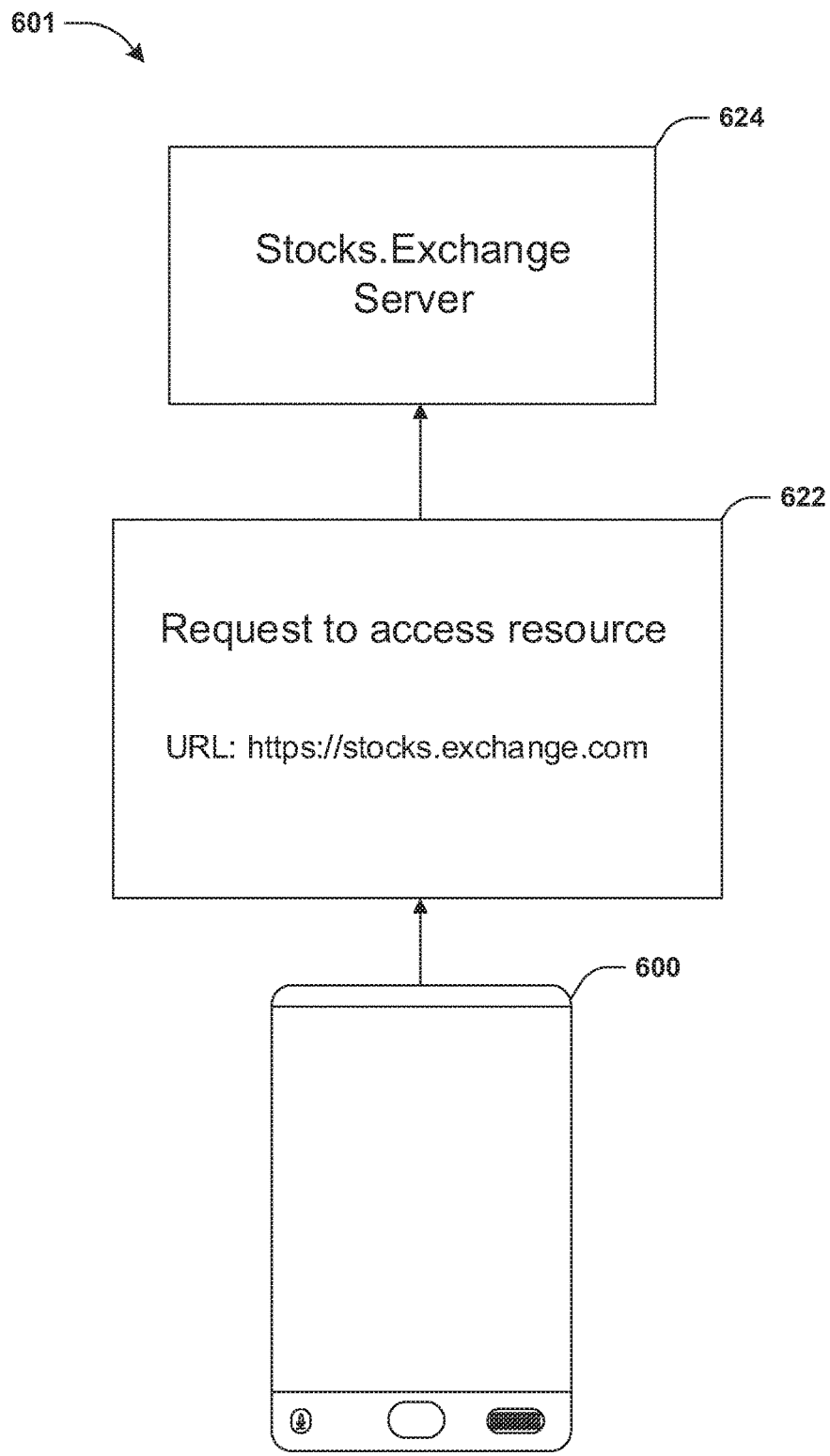
FIG. 6C is a component block diagram illustrating an example system for determining whether activity associated with a client device is fraudulent and/or malicious based upon the activity and one or more automatically determined thresholds, where a client device transmits a request to access a resource to a first server.

FIG. 6C illustrates the client device 600 transmitting a request to access a resource 622 to a first server 624. In some examples, the request to access the resource 622 may be transmitted responsive to the second search result 612 being selected. For example, the resource may correspond to the fourth web page 644. For example, the request to access the resource 622 may comprise an indication of the fourth web page 644 (e.g., a web address "https://stocks.exchange.com"). Alternatively and/or additionally, the first server 624 may be associated with the fourth web page 644.

Figure 6D:
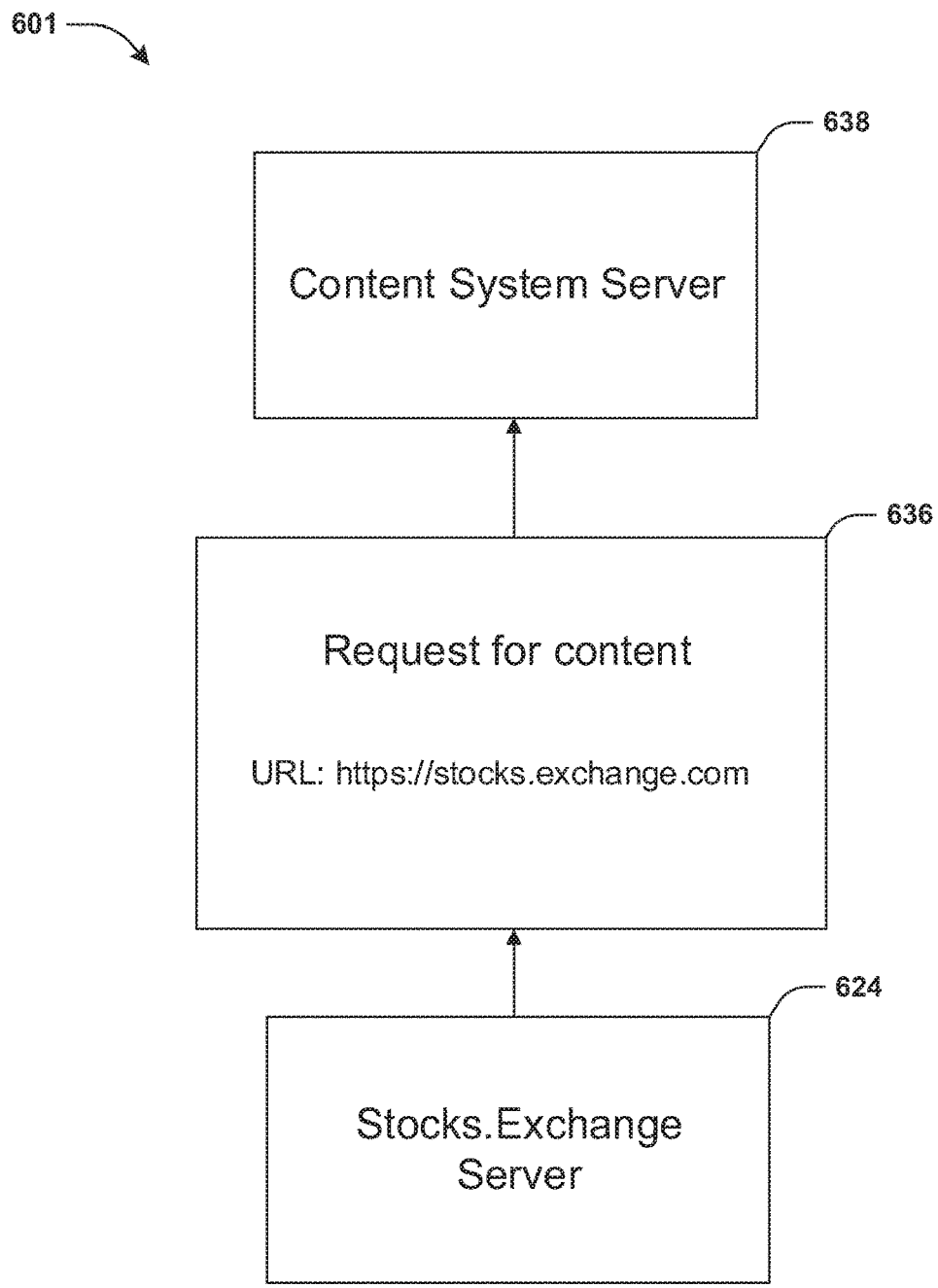
FIG. 6D is a component block diagram illustrating an example system for determining whether activity associated with a client device is fraudulent and/or malicious based upon the activity and one or more automatically determined thresholds, where a first server transmits a request for content to a second server associated with a content system.

FIG. 6D illustrates the first server 624 transmitting a request for content 636 to a second server 638 associated with the content system. In some examples, the request for content 636 may be transmitted (by the first server 624) responsive to receiving the request to access the resource 622. Alternatively and/or additionally, the request for content 636 may be transmitted (to the second server 638) by the client device 600. In some examples, the request for content 636 may be a request to be provided with a content item (e.g., an advertisement, an image, a link, a video, etc.) (for presentation via the fourth web page 644).

Figure 6E:
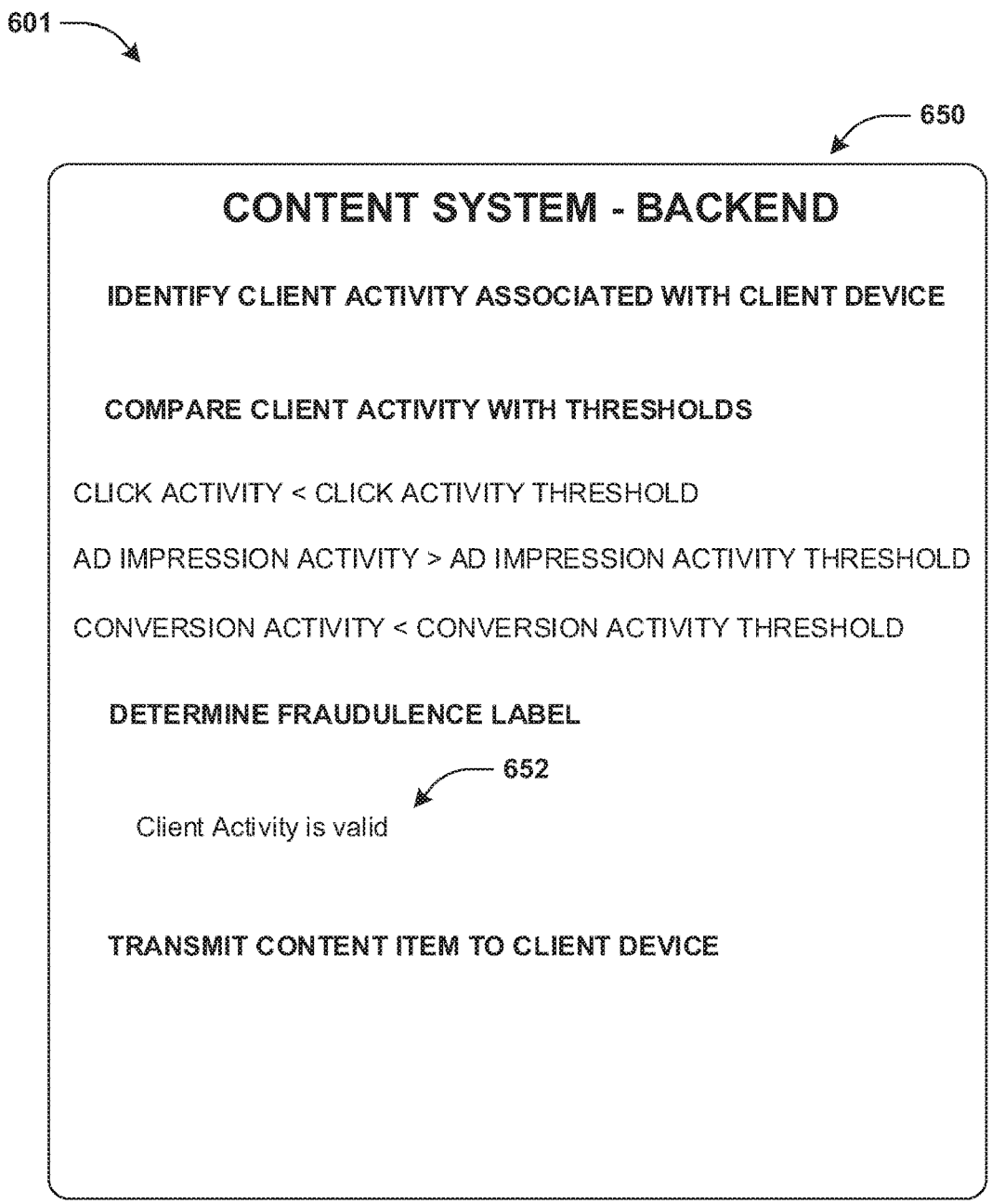
FIG. 6E is a component block diagram illustrating an example system for determining whether activity associated with a client device is fraudulent and/or malicious based upon the activity and one or more automatically determined thresholds, where a backend system selects a content item for presentation via a client device.

FIG. 6E illustrates a backend system 650 (of the content system) selecting a content item for presentation via the client device 600. For example, a bidding process may be performed (by the backend system 650) to select a content item from a plurality of content items participating in an auction. Prior to performing the bidding process to select a content item from the plurality of content items participating in the auction, a plurality of amounts of client activity may be compared with the plurality of threshold amounts of activity.

The plurality of amounts of client activity may be associated with the plurality of types of activity. For example, the plurality of amounts of client activity may be determined based upon client activity associated with the client device 600 performed within the duration of time. The client activity may comprise selections of content items, presentation of content items via the client device 600 and/or conversion events performed via the client device 600. In some examples, the plurality of amounts of client activity may correspond to a quantity of selections of content items within the duration of time, a quantity of content items presented via the client device 600 within the duration of time and/or a quantity of conversion events performed via the client device 600 within the duration of time. The plurality of amounts of client activity may be updated responsive to detecting activity associated with the client device 600. For example, responsive to detecting and/or receiving a selection of a content item presented via the client device 600, the quantity of selections of content items may be updated (e.g., incremented).

In some examples, the plurality of amounts of client activity may be compared with the plurality of threshold amounts of activity. For example, the quantity of selections of content items (e.g., "CLICK ACTIVITY") may be compared with the threshold quantity of selections of content (e.g., "CLICK ACTIVITY THRESHOLD") to determine that the quantity of selections of content items does not exceed the threshold quantity of selections of content. Alternatively and/or additionally, the quantity of content items presented via the client device 600 (e.g., "AD IMPRESSION ACTIVITY") may be compared with the threshold quantity of presented content items (e.g., "AD IMPRESSION ACTIVITY THRESHOLD") to determine that the quantity of content items presented via the client device 600 exceeds the threshold quantity of presented content items. Alternatively and/or additionally, the quantity of conversion events performed via the client device 600 (e.g., "CONVERSION ACTIVITY") may be compared with the threshold quantity of conversion events (e.g., "CONVERSION ACTIVITY THRESHOLD") to determine that the quantity of conversion events performed via the client device 600 does not exceed the threshold quantity of conversion events.

In some examples, a second fraudulence label 652 may be determined based upon the plurality of amounts of client activity and/or the plurality of threshold amounts of activity. For example, it may be determined that 1 amount of client activity of the plurality of amounts of client activity associated with the client device 600 exceeds 1 threshold amount of activity of the plurality of threshold amounts of activity (e.g., the quantity of content items presented via the client device 600 exceeds the threshold quantity of presented content items). In an example where the threshold quantity of amounts of client activity is 2, the second fraudulence label 652 may be indicative of activity associated with the client device 600 being valid.

In some examples, responsive to determining that the second fraudulence label 652 is indicative of activity associated with the client device 600 being valid, the bidding process may be performed and/or a first content item 646 (e.g., an advertisement) may be selected for presentation via the client device 600. For example, the first content item 646 may be transmitted to the client device 600 for presentation via the fourth web page 644.

Figure 6F:
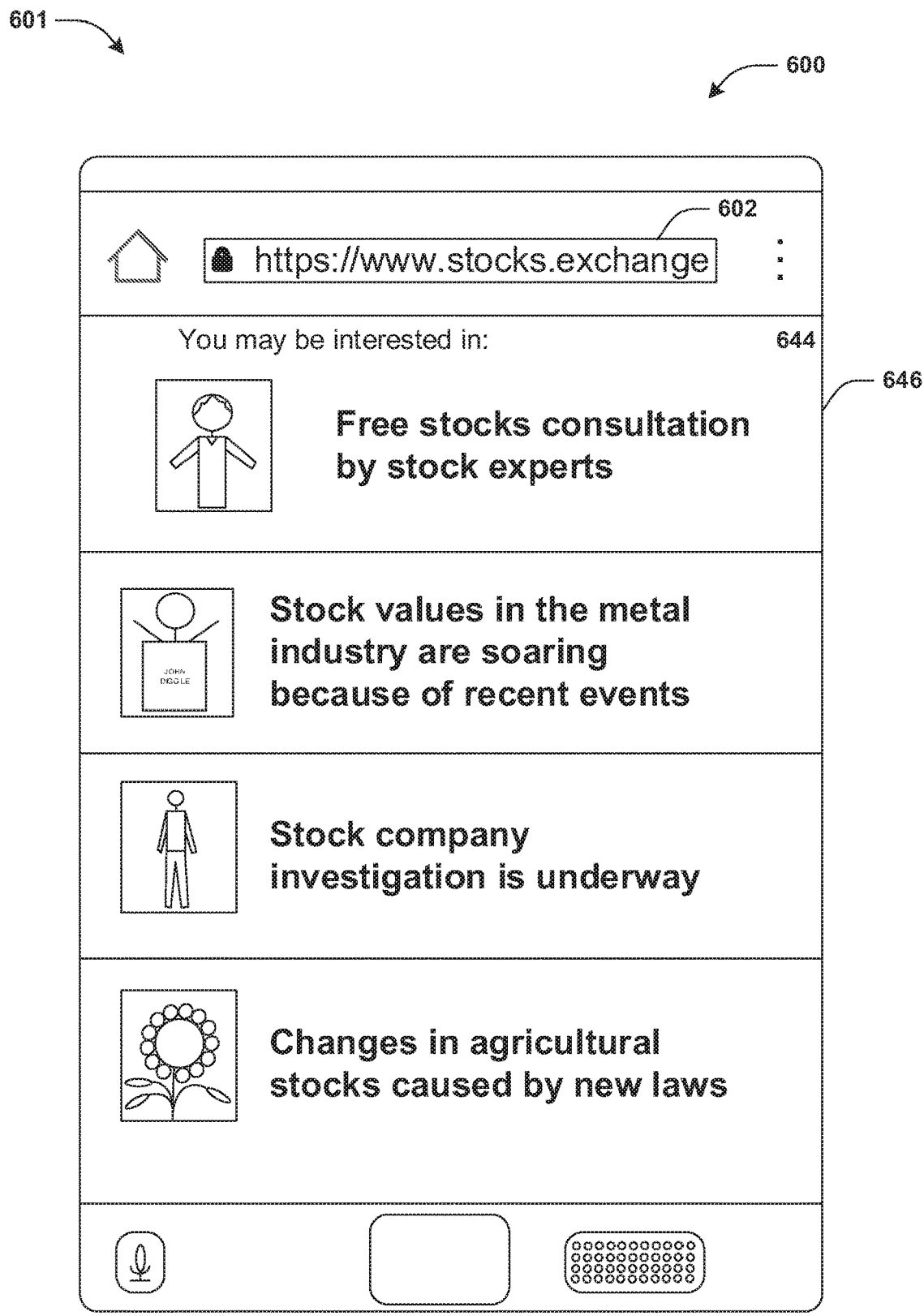
FIG. 6F is a component block diagram illustrating an example system for determining whether activity associated with a client device is fraudulent and/or malicious based upon the activity and one or more automatically determined thresholds, where a client device presents and/or accesses a fourth web page using a browser of the client device.

FIG. 6F illustrates the client device 600 presenting and/or accessing the fourth web page 644 using the browser of the client device 600. For example, the content system may provide the first content item 646 to be presented via the fourth web page 644 while the fourth web page 644 is accessed by the client device 600. Alternatively and/or additionally, responsive to the first content item 646 being presented via the client device 600, the quantity of content items presented via the client device 600 may be updated (e.g., incremented).

It may be appreciated that user activity may change over time such that activity distributions associated with the user activity may also change (e.g., shapes, peaks, etc. associated with the activity distributions may change as people change the way they use computer applications and/or other services). Thus, manually determining thresholds for changing activity may require periodically employing experts to perform research on user activity and/or to determine thresholds based upon the research.

Implementation of at least some of the disclosed subject matter may lead to benefits including, but not limited to, automatically and/or more accurately determining thresholds. For example, thresholds associated with user activity (e.g., advertisement activity, email activity, purchase activity, banking activity, etc.) may be determined automatically. The thresholds may be determined periodically (e.g., one or more of one or more times per day, one or more times per week, one or more times per month, etc.) using one or more of the techniques presented herein such that changed user behaviors and/or changed activity distributions are accounted for automatically. Accordingly, by applying one or more of the techniques presented herein for determining thresholds, experts may not be required to perform research on user activity and/or determine thresholds based upon the research, as a result of automatically detecting user activity and/or as a result of automatically determining one or more thresholds based upon one or more activity distributions generated based upon the user activity.

Alternatively and/or additionally, implementation of at least some of the disclosed subject matter may lead to benefits including a reduction in instances that client devices are hacked and/or controlled for performance of malicious actions and/or transmission of fraudulent advertisement requests (e.g., as a result of discouraging malicious entities from performing malicious actions to control client devices by automatically detecting client devices associated with fraudulent and/or malicious activity).

Alternatively and/or additionally, implementation of at least some of the disclosed subject matter may lead to benefits including preventing unauthorized access of client devices and/or the content system (e.g., as a result of discouraging malicious entities from performing malicious actions to control client devices for performance of malicious actions and/or transmission of fraudulent advertisement requests).

Alternatively and/or additionally, implementation of at least some of the disclosed subject matter may lead to benefits including decreasing security resources needed to protect client devices and/or the content system from unauthorized access.

Alternatively and/or additionally, implementation of at least some of the disclosed subject matter may lead to benefits including reducing bandwidth (e.g., as a result of identifying client devices associated with fraudulent and/or malicious activity and/or not transmitting content items to the client devices).

Alternatively and/or additionally, implementation of at least some of the disclosed subject matter may lead to benefits including reducing an amount spent by entities (e.g., advertisers) on fraudulent advertisement requests.

In some examples, at least some of the disclosed subject matter may be implemented on a client device, and in some examples, at least some of the disclosed subject matter may be implemented on a server (e.g., hosting a service accessible via a network, such as the Internet).

Figure 7:
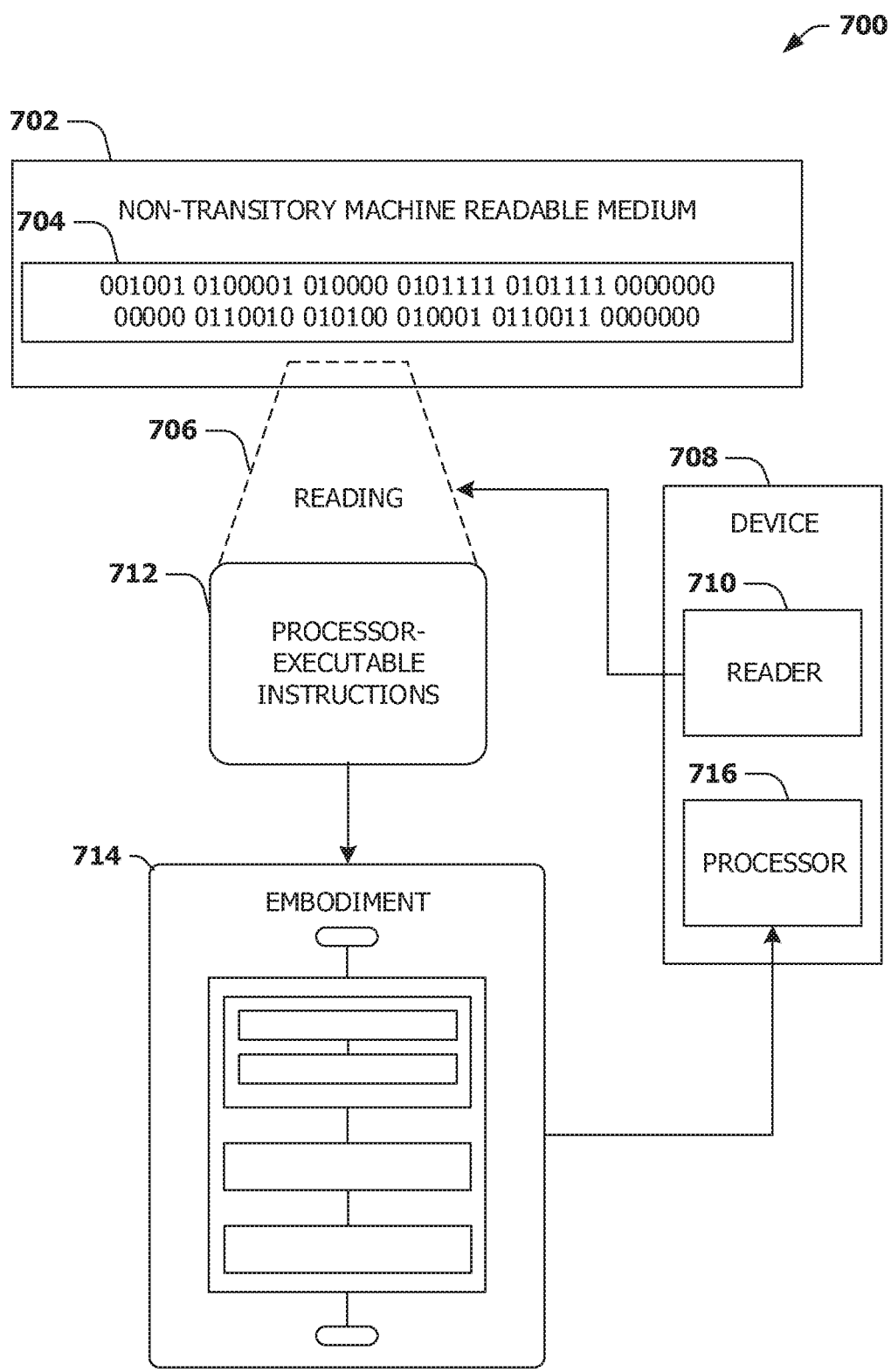
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the example system 501 of FIGS. 5A-5C, and/or at least some of the example system 601 of FIGS. 6A-6F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    detecting first activity associated with a plurality of client devices;
    determining, based upon the first activity, a first activity distribution associated with the plurality of client devices;
    identifying a plurality of peaks of the first activity distribution;
    determining a plurality of gradients associated with pairs of peaks of the plurality of peaks;
    determining, based upon the plurality of gradients, a target peak of the plurality of peaks;
    determining, based upon the target peak and the first activity distribution, a first threshold amount of activity associated with the first activity;
    detecting a first set of activity associated with a first client device; and
    determining, based upon the first set of activity and the first threshold amount of activity, a fraudulence label associated with the first client device.

2. The method of claim 1, wherein the detecting the first activity comprises:
    receiving requests for content from the plurality of client devices, wherein the first activity distribution is indicative of:
        a first quantity of client devices of the plurality of client devices associated with a first amount of activity associated with the first activity; and
        a second quantity of client devices of the plurality of client devices associated with a second amount of activity associated with the first activity.

3. The method of claim 2, wherein:
    the first amount of activity corresponds to a first quantity of requests for content received from a client device;
    the second amount of activity corresponds to a second quantity of requests for content received from a client device; and
    the first threshold amount of activity corresponds to a threshold quantity of requests for content.

4. The method of claim 1, wherein the detecting the first activity comprises:
    identifying selections of content received from the plurality of client devices, wherein the first activity distribution is indicative of:
        a first quantity of client devices of the plurality of client devices associated with a first amount of activity associated with the first activity; and
        a second quantity of client devices of the plurality of client devices associated with a second amount of activity associated with the first activity.

5. The method of claim 4, wherein:
    the first amount of activity corresponds to a first quantity of selections of content associated with a client device;
    the second amount of activity corresponds to a second quantity of selections of content associated with a client device; and
    the first threshold amount of activity corresponds to a threshold quantity of selections of content.

6. The method of claim 1, wherein the detecting the first activity comprises:
    identifying content transmitted to the plurality of client devices, wherein the first activity distribution is indicative of:
        a first quantity of client devices of the plurality of client devices associated with a first amount of activity associated with the first activity; and
        a second quantity of client devices of the plurality of client devices associated with a second amount of activity associated with the first activity.

7. The method of claim 6, wherein:
    the first amount of activity corresponds to a first quantity of content items transmitted to a client device;
    the second amount of activity corresponds to a second quantity of content items transmitted to a client device; and
    the first threshold amount of activity corresponds to a threshold quantity of content items transmitted to a client device.

8. The method of claim 1, wherein the detecting the first activity comprises:
    identifying content presented via the plurality of client devices, wherein the first activity distribution is indicative of:
        a first quantity of client devices of the plurality of client devices associated with a first amount of activity associated with the first activity; and
        a second quantity of client devices of the plurality of client devices associated with a second amount of activity associated with the first activity.

9. The method of claim 8, wherein:
    the first amount of activity corresponds to a first quantity of content items presented via a client device;
    the second amount of activity corresponds to a second quantity of content items presented via a client device; and
    the first threshold amount of activity corresponds to a threshold quantity of content items presented via a client device.

10. The method of claim 1, wherein the detecting the first activity comprises:
    detecting conversion events associated with the plurality of client devices, wherein the first activity distribution is indicative of:
        a first quantity of client devices of the plurality of client devices associated with a first amount of activity associated with the first activity; and
        a second quantity of client devices of the plurality of client devices associated with a second amount of activity associated with the first activity.

11. The method of claim 10, wherein:
the first amount of activity corresponds to a first quantity of conversion events associated with a client device;
the second amount of activity corresponds to a second quantity of conversion events associated with a client device; and
the first threshold amount of activity corresponds to a threshold quantity of conversion events.

12. The method of claim 1, wherein the fraudulence label is indicative of at least one of:
activity associated with the first client device being fraudulent;
activity associated with the first client device being valid; or
a probability that activity associated with the first client device is fraudulent.

13. The method of claim 12, wherein the first activity is associated with a first type of activity, wherein the determining the fraudulence label comprises:
determining, based upon the first set of activity, a first amount of activity, associated with the first type of activity, of the first set of activity, wherein the fraudulence label is determined based upon a comparison of the first amount of activity with the first threshold amount of activity.

14. The method of claim 12, wherein the first activity is associated with a first type of activity, the method comprising:
detecting second activity associated with a second plurality of client devices, wherein the second activity is associated with a second type of activity different than the first type of activity;
determining, based upon the second activity, a second activity distribution associated with the second plurality of client devices;
identifying a second plurality of peaks of the second activity distribution;
determining a second plurality of gradients associated with pairs of peaks of the second plurality of peaks;
determining, based upon the second plurality of gradients, a second target peak of the second plurality of peaks; and
determining, based upon the second target peak, a second threshold amount of activity associated with the second type of activity.

15. The method of claim 14, wherein the determining the fraudulence label comprises:
determining, based upon the first set of activity, a first amount of activity, associated with the first type of activity, of the first set of activity; and
determining, based upon the first set of activity, a second amount of activity, associated with the second type of activity, of the first set of activity, wherein the fraudulence label is determined based upon a first comparison of the first amount of activity with the first threshold amount of activity and a second comparison of the second amount of activity with the second threshold amount of activity.

16. The method of claim 1, wherein the determining the target peak comprises:
analyzing the plurality of gradients to determine a greatest gradient of the plurality of gradients, wherein the target peak is comprised within a first pair of peaks, of the plurality of peaks, associated with the greatest gradient.

17. The method of claim 1, wherein the determining the first threshold amount of activity comprises:
selecting a peak, of the plurality of peaks, based upon the target peak; and
determining an amount of activity associated with the peak, wherein the first threshold amount of activity is based upon the amount of activity.

18. A computing device comprising:
a processor; and
memory comprising processor-executable instructions that when executed by the processor cause performance of operations, the operations comprising:
detecting first activity associated with a plurality of client devices;
determining, based upon the first activity, a first activity distribution associated with the plurality of client devices;
identifying a plurality of peaks of the first activity distribution;
determining a plurality of relationships between pairs of peaks of the plurality of peaks;
determining, based upon the plurality of relationships, a target peak of the plurality of peaks;
determining, based upon the target peak, a first threshold amount of activity associated with the first activity;
detecting a first set of activity associated with a first client device; and
determining, based upon the first set of activity and the first threshold amount of activity, a fraudulence label associated with the first client device.

19. The computing device of claim 18, wherein the plurality of relationships comprises at least one of:
a plurality of gradients associated with the pairs of peaks of the plurality of peaks; or
a plurality of slopes associated with the pairs of peaks of the plurality of peaks.

20. A non-transitory machine readable medium having stored thereon processor-executable instructions that when executed cause performance of operations, the operations comprising:
detecting first activity associated with a plurality of client devices;
determining, based upon the first activity, a first activity distribution associated with the plurality of client devices;
identifying a plurality of peaks of the first activity distribution;
determining a plurality of relationships between pairs of peaks of the plurality of peaks;
determining, based upon the plurality of relationships, a target peak of the plurality of peaks; and
determining, based upon the target peak, a first threshold amount of activity associated with the first activity.

* * * * *